United States Patent
Mosayyebpour Kaskari et al.

(10) Patent No.: US 12,499,903 B2
(45) Date of Patent: Dec. 16, 2025

(54) NEURAL NETWORK TRAINING FOR SPEECH ENHANCEMENT

(71) Applicant: Synaptics Incorporated, San Jose, CA (US)

(72) Inventors: Saeed Mosayyebpour Kaskari, Irvine, CA (US); Atabak Pouya, Irvine, CA (US)

(73) Assignee: Synaptics Incorporated, San Jose, CA (US)

( * ) Notice: Subject to any disclaimer, the term of this patent is extended or adjusted under 35 U.S.C. 154(b) by 309 days.

(21) Appl. No.: 18/054,856

(22) Filed: Nov. 11, 2022

(65) Prior Publication Data

US 2024/0170008 A1   May 23, 2024

(51) Int. Cl.
*G10L 25/30* (2013.01)
*G06N 3/082* (2023.01)
(Continued)

(52) U.S. Cl.
CPC .............. *G10L 25/30* (2013.01); *G06N 3/082* (2013.01); *G10L 21/0232* (2013.01); *G10L 25/18* (2013.01); *G10L 25/21* (2013.01)

(58) Field of Classification Search
CPC ..... G10L 25/30; G10L 21/0232; G10L 25/18; G10L 25/21; G10L 21/0208;
(Continued)

(56) References Cited

U.S. PATENT DOCUMENTS 9,064,498 B2 *   6/2015   Uhle ................... G10L 21/0208
10,529,349 B2 *   1/2020   Le Roux ................. G06N 3/08
(Continued)

FOREIGN PATENT DOCUMENTS

WO    WO-2024051676 A1 *   3/2024   ............. G06N 3/084

OTHER PUBLICATIONS

Wang, DeLiang, and Jitong Chen. "Supervised speech separation based on deep learning: An overview." IEEE/ACM transactions on audio, speech, and language processing 26.10 (2018): 1702-1726. (Year: 2018).*

(Continued)

*Primary Examiner* — Bhavesh M Mehta
*Assistant Examiner* — Jangwoen Lee
(74) *Attorney, Agent, or Firm* — Paradice & Li LLP

(57) ABSTRACT

A method of training neural networks may include receiving a sequence of audio frames, and mapping a first audio frame in the sequence of audio frames to a first output frame based on a neural network. The first output frame may represent a noise-invariant component of the first audio frame. The method may also include determining a first loss value based on differences between the first output frame and a first ground truth frame. The method may include mapping the first audio frame to a second output frame based on the neural network. The second output frame may represent a noise-variant component of the first audio frame. The method may further include determining a second loss value based on differences between the second output frame and a second ground truth frame, and updating the neural network based at least in part on the first and second loss values.

20 Claims, 8 Drawing Sheets

(51) Int. Cl.
G10L 21/0232 (2013.01)
G10L 25/18 (2013.01)
G10L 25/21 (2013.01)

(58) Field of Classification Search
CPC .. G10L 21/0216; G06N 3/082; G06N 3/0455; G06N 3/0464; G06N 3/09; G06N 3/0985; G06N 3/08; G06N 5/041
See application file for complete search history.

(56) References Cited

U.S. PATENT DOCUMENTS

| | | | |
|---|---|---|---|
| 10,672,414 B2* | 6/2020 | Tashev | G06N 3/045 |
| 11,817,111 B2* | 11/2023 | Fejgin | G06F 3/16 |
| 2016/0111108 A1* | 4/2016 | Erdogan | G10L 21/0324 |
| | | | 704/226 |

OTHER PUBLICATIONS

Han, Kun, et al. "Learning spectral mapping for speech dereverberation and denoising." IEEE/ACM Transactions on Audio, Speech, and Language Processing 23.6 (2015): 982-992. (Year: 2015).*

Afouras et al., "The Conversation: Deep Audio Visual Speech Enhancement," Proc. Interspeech 2018, pp. 3244-3248, 2018.

Arjovsky et al., "Unitary Evolution Recurrent Neural Networks," in International Conference on Machine Learning, pp. 1120-1128, 2016.

Choi et al., "Phase-Aware Speech Enhancement with Deep Complex U-Net," International Conference on Learning Representations, pp. 1-20, 2019.

Cogswell et al., "Reducing Overfitting in Deep Networks by Decorrelating Representations," arXiv preprint arXiv:1511.06068, pp. 1-11, 2015.

Ephrat et al., "Looking to Listen at the Cocktail Party: A Speaker-Independent Audio-Visual Model for Speech Separation," arXiv preprint arXiv:1804.03619 v2, pp. 1-11, 2018.

Erdogan et al., "Phase-Sensitive and Recognition-Boosted Speech Separation Using Deep Recurrent Neural Networks," in Acoustics, Speech and Signal Processing (ICASSP), 2015 IEEE International Conference on, pp. 708-712, IEEE, 2015.

Germain et al., "Speech Denoising with Deep Feature Losses," arXiv preprint arXiv: 1806.10522 v2, pp. 1-6, 2018.

Glorot et al., "Understanding the Difficulty of Training Deep Feedforward Neural Networks," in Proceedings of the Thirteenth International Conference on Artificial Intelligence and Statistics, pp. 249-256, 2010.

Grais et al., "Single-Channel Audio Source Separation Using Deep Nerual Network Ensembles," in Audio Engineering Society Convention 140, Audio Engineering Society, pp. 1-7, 2016.

Griffin et al., "Signal Estimation from Modified Short-Time Fourier Transform," IEEE Transactions on Acoustics, Speech, and Signal Processing, 32(2):236-243, 1984.

Huang et al., "Deep Learning for Monaural Speech Separation," in Acoustics, Speech and Signal Processing (ICASSP), 2014 IEEE International Conference on, pp. 1562-1566, IEEE, 2014.

Jansson et al., "Singing Voice Separation with Deep U-Net Convolutional Networks," in ISMIR, pp. 745-751, 2017.

Kim et al., "NSML: Meet the Mlaas Platform with a Real-World Case Study," arXiv preprint arXiv:1810.09957, pp. 1-11, 2018.

Lee et al., "Fully Complex Deep Neural Network for Phase-Incorporating Monaural Source Separation," in IEEE International Conference on Acoustics, Speech and Signal Processing (ICASSP), pp. 281-285, IEEE, 2017a.

Lee et al., "Discriminative Training of Complex-Valued Deep Recurrent Neural Network for Singing Voice Separation," In Proceedings of the 2017 ACM on Multimedia Conference, pp. 1327-1335, ACM, 2017b.

Maas et al., "Rectifier Nonlinearities Improve Neural Network Acoustic Models," in Proc. ICML, vol. 30, pp. 1-6, 2013.

Nugraha et al., "Multichannel Audio Source Separation with Deep Neural Networks," IEEE/ACM Trans. Audio, Speech & Language Processing, 24(9): 1652-1664, 2016.

Pascual et al., "Segan: Speech Enhancement Generative Adversarial Network," In Proc. Interspeech, 2017, pp. 3642-3646, 2017.

Perraudin et al., "A Fast Griffin-Lim Algorithm," in Applications of Signal Processing to Audio and Acoustics (WASPAA), 2013 IEEE Workshop on, pp. 1-4, IEEE, 2013.

Rethage et al., "A Wavenet for Speech Denoising," in IEEE International Conference on Acoustics, Speech and Signal Processing (ICASSP), pp. 1-11, 2018.

Ronneberger et al., "U-Net: Convolutional Networks for Biomedical Image Segmentation," in International Conference on Medical Image Computing and Computer-Assisted Intervention, pp. 234-241, 2015.

Roux et al., "Phase-book and Friends: Leveraging Discrete Representations for Source Separation," arXiv preprint arXiv:1810.01395v1, pp. 1-12, 2018.

Scalart et al., "Speech Enhancement Based on a Priori Signal to Noise Estimation," in Acoustics, Speech, and Signal Processing, 1996, ICASSP-96, Conference Proceedings, 1996 IEEE International Conference on, vol. 2, pp. 629-632, IEEE, 1996.

Soni et al., "Time-Frequency Masking-Based Speech Enhancement Using Generative Adversarial Network," in IEEE International Conference on Acoustics, Speech and Signal Processing (ICASSP), pp. 5039-5043, 2018.

Stoller et al., "Wave-u-net: A Multi-scale Neural Network for End-to-End Audio Source Separation," in ISMIR, pp. 334-340, 2018.

Sung et al., "NSML: A Machine Learning Platform that Enables You to Focus on Your Models," arXiv preprint arXiv:1712.05902v1, pp. 1-8, 2017.

Takahashi et al., "Phasenet: Discretized Phase Modeling with Deep Neural Networks for Audio Source Separation," Proc. Interspeech 2018, pp. 2713-2717, 2018a.

Takahashi et al., Mmdenselstm: An efficient Combination of Convolutional and Recurrent Neural Networks for Audio Source Separation, arXiv preprint arXiv:1805.02410, 2018b.

Thiemann et al., "The Diverse Environments Multi-Channel Acoustic Noise Database: A Database of Multichannel Environmental Noise Recordings," The Journal of the Acoustical Society of America, 133(5):3591, 2013.

Trabelsi et al., "Deep Complex Networks," in International Conference on Learning Representations, pp. 1-19, 2018.

Veaux et al., "The Voice Bank Corpus: Design, Collection and Data Analysis of a Large Regional Accent Speech Database," in Oriental COCOSDA Held Jointly with 2013 Conference on Asian Spoken Language Research and Evaluation (O-COCOSDA/CASLRE), 2013 International Conference, pp. 1-4, IEEE, 2013.

Venkataramani et al., "Adaptive Front-Ends for End-to-End Source Separation," in Workshop Machine Learning for Audio Signal Processing at NIPS (ML4Audio@NIPS17), pp. 1-5, 2017.

Vincent et al., "Performance Measurement in Blind Audio Source Separation," IEEE Transactions on Audio, Speech, and Language Processing, 14(4):1462-1469, 2006. ISSN 1558-7916.doi:10.1109/TSA.2005.858005.

Wang, "Deep Learning Reinvents the Hearing Aid," IEEE Spectrum, 54(3): 32-37, 2017.

Wang et al., "On Training Targets for Supervised Speech Separation," IEEE/ACM Transactions on Audio, Speech and Language Processing (TASLP), 22 (12):1849-1858, 2014.

Wang et al., "Multi-Channel Deep Clustering: Discriminative Spectral and Spatial Embeddings for Speaker-Independent Speech Separation," Mitsubishi Electric Research Laboratories, pp. 1-6, 2018.

Wang et al., "Oracle Performance Investigation of the Ideal Masks," in Acoustic Signal Enhancement (IWAENC), 2016 EEE International Workshop on, pp. 1-5, IEEE, 2016.

Weninger et al., "Speech Enhancement with LSTM Recurrent Nerual Networks and Its Application to Noise-Robust ASR," in International Conference on Latent Variable Analysis and Signal Separation, pp. 91-99, Springer, 2015.

(56) References Cited

OTHER PUBLICATIONS

Williamson et al., "Complex Ratio Masking for Monaural Speech Separation," IEEE/ACM Transactions on Audio, Speech and Language Processing (TASLP), 24(3):483-492, 2016.
Wisdom et al., "Full-Capacity Unitary Recurrent Neural Networks," in Advances in Neural Information Processing Systems, pp. 4880-4888, 2016.
Xu et al., A Regression Approach to Speech Enhancement Based on Deep Neural Networks, IEEE/ACM Transactions on Audio, Speech and Language Processing (TASLP), 23(1):7-19, 2015.
Yegnanarayana et al., "Significance of Group Delay Functions in Spectrum Estimation," IEEE Transactions on Signal Processing, 40(9):2281-2289, 1992.
Yu et al., "Permutation Invariant Training of Deep Models for Speaker-Independent Multi-talker Speech Separation," in Acoustics, Speech and Signal Processing (ICASSP), arXiv:1607.00325v2, pp. 241-245, IEEE, 2017.

* cited by examiner

NEURAL NETWORK TRAINING FOR SPEECH ENHANCEMENT

TECHNICAL FIELD

The present embodiments relate generally to neural networks, and specifically to training neural networks for speech enhancement.

BACKGROUND OF RELATED ART

Many machine learning approaches for enhancing speech in an audio signal are based on signal-to-noise ratio (SNR) information. These approaches often require a significant amount of training data to train a machine learning model (e.g., a neural network model) to account for large variations in noise. Consequently, once the machine model is trained, the machine learning model may be too large to be implemented on resource-constrained platforms, such as mobile devices, wearable technologies, or Internet of Things (IOT) devices. Moreover, many machine learning approaches for enhancing speech in an audio signal are not well-suited for far-field applications, where a speech source is located a distance from one or more audio capture devices.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

One innovative aspect of the subject matter of this disclosure can be implemented in a method of training neural networks. The method may include receiving a sequence of audio frames, and mapping a first audio frame in the sequence of audio frames to a first output frame based on a neural network. The first output frame may represent a noise-invariant component of the first audio frame. The method may further include determining a first loss value based on differences between the first output frame and a first ground truth frame. The method may also include mapping the first audio frame to a second output frame based on the neural network, where the second output frame represents a noise-variant component of the first audio frame. In addition, the method may include determining a second loss value based on differences between the second output frame and a second ground truth frame, and updating the neural network based at least in part on the first loss value and the second loss value.

Another innovative aspect of the subject matter of this disclosure can be implemented in a machine learning system including a processing system and a memory. The memory may store instructions that, when executed by the processing system, cause the machine learning system to receive a sequence of audio frames, and map a first audio frame in the sequence of audio frames to a first output frame based on a neural network. The first output frame may represent a noise-invariant component of the first audio frame. Execution of the instructions may further cause the machine learning system to determine a first loss value based on differences between the first output frame and a first ground truth frame, and map the first audio frame to a second output frame based on the neural network. The second output frame may represent a noise-variant component of the first audio frame. In addition, execution of the instructions may cause the machine learning system to determine a second loss value based on differences between the second output frame and a second ground truth frame, and update the neural network based at least in part on the first loss value and the second loss value.

Another innovative aspect of the subject matter of this disclosure can be implemented in a method of training neural networks. The method may include receiving a sequence of audio frames, and mapping a first audio frame in the sequence of audio frames to a first output frame based on a first neural network. The first output frame may represent a noise-invariant component of the first audio frame. The method may also include determining a first loss value based on differences between the first output frame and a first ground truth frame, and updating the first neural network based at least in part on the first loss value.

BRIEF DESCRIPTION OF THE DRAWINGS

The present embodiments are illustrated by way of example and are not intended to be limited by the figures of the accompanying drawings.

DETAILED DESCRIPTION

Figure 1:
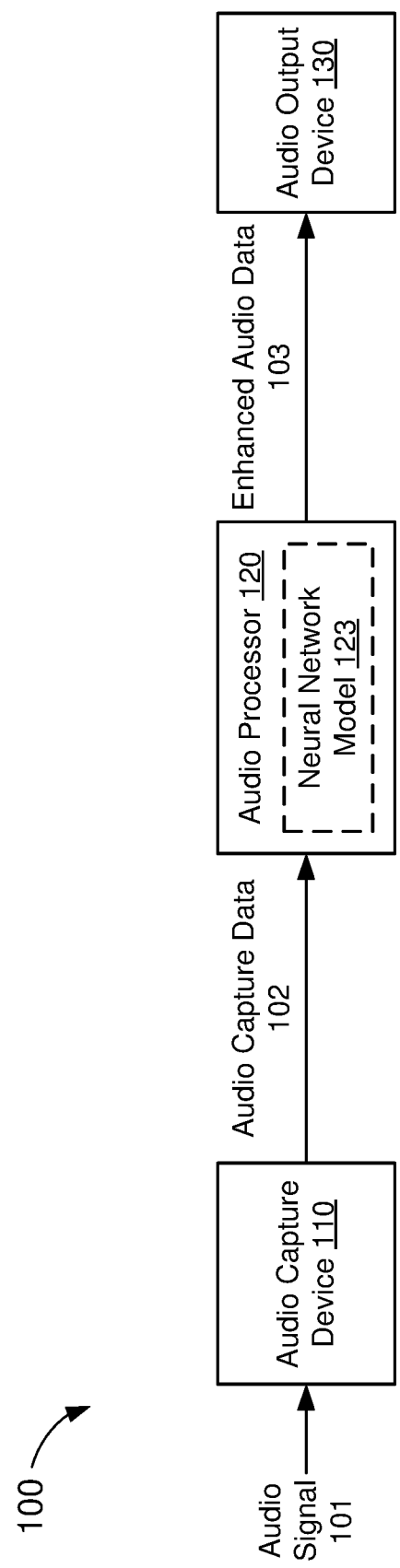
FIG. 1 shows a block diagram of an example audio capture and output system that may employ a neural network model, according to some embodiments.

In the following description, numerous specific details are set forth such as examples of specific components, circuits, and processes to provide a thorough understanding of the present disclosure. The term "coupled" as used herein means connected directly to or connected through one or more intervening components or circuits. The terms "electronic system" and "electronic device" may be used interchangeably to refer to any system capable of electronically processing information. Also, in the following description and for purposes of explanation, specific nomenclature is set forth to provide a thorough understanding of the aspects of the disclosure. However, it will be apparent to one skilled in the art that these specific details may not be required to practice the example embodiments. In other instances, well-known circuits and devices are shown in block diagram form to avoid obscuring the present disclosure. Some portions of the detailed descriptions which follow are presented in terms of procedures, logic blocks, processing and other symbolic representations of operations on data bits within a computer memory.

These descriptions and representations are the means used by those skilled in the data processing arts to most effectively convey the substance of their work to others skilled in the art. In the present disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system. It should be borne in mind, however, that all of these and similar terms are to be associated with the appropriate physical quantities and are merely convenient labels applied to these quantities.

Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. Also, the example input devices may include components other than those shown, including well-known components such as a processor, memory and the like.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium including instructions that, when executed, perform one or more of the methods described above. The non-transitory processor-readable data storage medium may form part of a computer program product, which may include packaging materials.

The non-transitory processor-readable storage medium may comprise random access memory (RAM) such as synchronous dynamic random-access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors (or a processing system). The term "processor," as used herein may refer to any general-purpose processor, special-purpose processor, conventional processor, controller, microcontroller, and/or state machine capable of executing scripts or instructions of one or more software programs stored in memory.

Aspects of the disclosure provide systems and methods for enhancing speech in an audio signal. In some embodiments, a neural network (also referred to as a "neural network algorithm" or "neural network model") may be trained using multi-tasking to infer a clean representation of speech in an audio signal that includes speech and noise. In some embodiments, the neural network may be trained using a network structure that includes a backbone (e.g., an encoder) and multiple heads (e.g., decoders), where each head is trained to perform a different task. That is, one head may be trained to infer a speech (or noise-invariant) component of an audio signal, and the other head may be trained to infer a SNR-related (or noise-variant) component of the audio signal.

More generally, to train the neural network, a machine learning system may receive a sequence of audio frames. In some aspects, the sequence of audio frames may represent an audio signal that includes speech and noise. The machine learning system may also receive ground truth frames, which are reference frames of different components of the audio signal (or sequence of audio frames). In some embodiments, the machine learning system may receive a first ground truth frame that includes the speech (or noise-invariant) component of a first audio frame in the sequence of audio frames, with little or no noise. The machine learning system may also receive a second ground truth frame that includes a SNR-related (or noise-variant) component of the first audio frame.

In some embodiments, the machine learning system may map the first audio frame in the sequence of audio frames to a first output frame based on the neural network. In some aspects, the first output frame may represent an estimate of the speech (or noise-invariant) component of the first audio frame. The machine learning system may also determine a first loss value based on differences between the first output frame and the first ground truth frame. Further, the machine learning system may map the first audio frame in the sequence of audio frames to a second output frame based on the neural network. In some aspects, the second output frame may represent an estimate of a SNR-related (or noise-variant) component of the first audio frame. The machine learning system may further determine a second loss value based on differences between the second output frame and the second ground truth frame.

In some embodiments, the machine learning system may update the neural network based at least in part on the first and second loss values at, for example, the end of each iteration of the training process. In some aspects, the machine learning system may repeat the training process until certain convergence criteria are met. In some embodiments, the trained neural network model may be deployed in, for example, an audio capture and output system, and used to infer, in real time, enhanced representations of speech in audio frames. Unlike conventional techniques for speech enhancement, where a machine learning system is trained to model only the SNR of training data (often using a substantial amount of training data to account for large variations in noise), embodiments described herein use multi-tasking to train a machine learning system to model both a clean speech (or noise-invariant) component and SNR-related (or noise-variant) component of training data. Because variations in clean speech tend to be smaller than variations in noise, and because the embodiments described herein train a machine learning system to primarily model the clean speech component of training data, the techniques described herein may require less training data than conventional techniques for speech enhancement. Accordingly, a machine learning model trained using the systems and methods described herein may be smaller in size and better suited for resource-constrained platforms (e.g., mobile phones, wearable technologies, or IOT devices) relative to conventional machine learning models for speech enhancement.

FIG. 1 shows a block diagram of an example audio capture and output system 100 that may employ a neural network model, according to some embodiments. The system 100 includes an audio capture device 110, an audio processor 120, and an audio output device 130. The audio capture device 110 (e.g., a microphone or other acoustic sensor) captures (or records) a sequence of audio frames of an audio signal 101 and converts the audio frames to digital audio capture data 102 (also referred to as "audio capture data 102"). The audio output device 130 (e.g., wearable technology, a smartphone, or IoT device) may play the digital data by reproducing the captured audio signal using one or more speakers.

The audio processor 120 converts the audio capture data 102 to enhanced audio data 103 that, when played by the audio output device 130, may reflect the original audio signal captured by the audio capture device 110 as audio with little or no noise. For example, the audio processor 120 may be configured to enhance speech included in the audio capture data 102. Further, in some embodiments, the audio processor 120 may be configured to recognize speech in the enhanced audio data 103. Although depicted as an independent block in FIG. 1, in actual embodiments, the audio processor 120 may be incorporated or otherwise included in the audio capture device 110, the audio output device 130, or a combination thereof.

In some embodiments, the audio processor 120 may create enhanced representations of the audio capture data 102 (e.g., enhanced audio data 103) based on a neural network model 123 that is trained through machine learning. Machine learning is a technique for improving the ability of a computer system or application to perform a certain task. During a training phase, a machine learning system may be provided with multiple "answers" and one or more sets of raw data to be mapped to each answer. For example, the machine learning system may be trained to perform enhancement operations on a sequence of audio frames by providing the system with a sequence of audio frames captured of an audio signal that includes speech and noise (which represents the raw data). The machine learning system may also be provided one or more representative (or ground truth) frames of the same speech that contain little or no noise (which represents part of the answer), and one or more representative (or ground truth) frames of SNR-related information based on same speech and noise (which represents the rest of the answer). The machine learning system may then analyze the raw data to "learn" a set of rules that can be used to reproduce the answers. For example, the machine learning system may perform statistical analysis on the raw data to determine a common set of features (also referred to as "rules") related to speech and SNR-related information in the raw data.

In some aspects, the machine learning system may employ deep learning, which is a particular form of machine learning in which the model being trained is a multi-layer neural network. Deep learning architectures are often referred to as artificial neural networks due to the way in which information is processed (similar to a biological nervous system). For example, each layer of the deep learning architecture may be composed of a number of artificial neurons. The neurons may be interconnected across the various layers so that input data (or the raw data) may be passed from one layer to another. More specifically, each layer of neurons may perform a different type of transformation on the input data that will ultimately result in one or more desired outputs. The interconnected framework of neurons may be referred to as a neural network model. Thus, the neural network model 123 may include a set of rules that can be used to "infer" enhanced representations of the audio capture data 102. As such, the audio processor 120 may use the neural network model 123 to enhance speech in the audio capture data 102.

Figure 2:
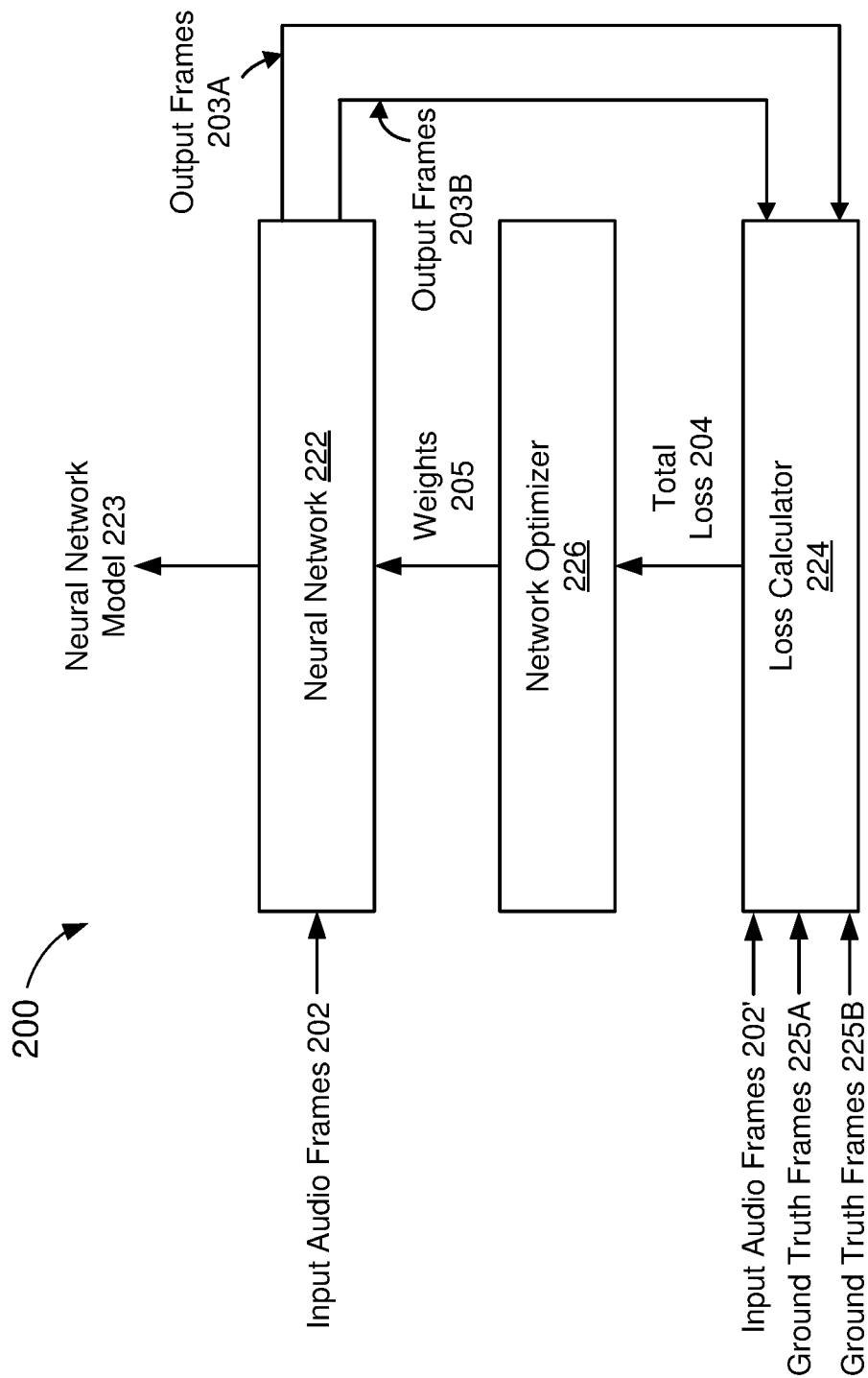
FIG. 2 shows a block diagram of an example machine learning system, according to some embodiments.

FIG. 2 shows a block diagram of an example machine learning system 200, according to some embodiments. The machine learning system 200 includes a neural network 222, a loss calculator 224, and a network optimizer 226. In some aspects, the machine learning system 200 may be used to train the neural network 222 to produce a neural network model 223. The neural network model 223 may be an embodiment of the neural network model 123 of FIG. 1.

As shown in FIG. 2, the machine learning system 200 may receive a sequence of input audio frames 202. In some aspects, the input audio frames 202 may represent an audio signal that includes speech and noise. The machine learning system 200 may also receive a sequence of ground truth frames 225A, where each ground truth frame 225A includes the same speech as the audio signal, but little or no noise. The machine learning system 200 may further receive a sequence of ground truth frames 225B, where each ground truth frame 225B includes SNR-related information based on the same speech and noise as the audio signal. In some embodiments, the SNR-related information may represent a gain based on the total energy of speech in the audio signal relative to the total energy of the audio signal. The machine learning system 200 may also receive a sequence of input audio frames 202', where each input audio frame 202' includes the audio signal and/or information related to the audio signal.

In some embodiments, the neural network 222 may be configured to receive an input audio frame 202 and produce an output frame 203A and an output frame 203B, based on the received input audio frame 202. In some aspects, the output frame 203A may represent an estimate of the speech (or noise-invariant) component of the input audio frame 202, and the output frame 203B may represent an estimate of a SNR-related (or noise-variant) component of the input audio frame 202. Further, in some aspects, the neural network 222 may produce enhanced representations of the sequence of input audio frames 202 by attempting to recreate the ground truth frames 225A and 225B.

In some embodiments, the neural network 222 may be a multi-head neural network (e.g., a neural network that includes multiple heads) configured to learn the characteristics of speech and SNR-related information in the input audio frames 202. In some aspects, the neural network 222 may form a network of weighted connections across multiple layers of artificial neurons (e.g., layers in a backbone and multiple heads) that begin with the sequence of input audio frames 202 and lead to a sequence of output frames 203A and a sequence of output frames 203B. In some embodiments, the neural network 222 may be configured to provide each sequence of output frames 203A and 203B to the loss calculator 224.

As shown in FIG. 2, the loss calculator 224 may be configured to receive each of the output frames 203A and 203B from the neural network 222. The loss calculator 224 may also be configured to receive each of the ground truth frames 225A and 225B, and each of the input audio frames 202'. In some aspects, the loss calculator 224 may be configured to determine an amount of loss (or error) in each output frame 203A relative to a respective ground truth frame 225A. For example, to determine a first loss, the loss calculator 224 may compare an output frame 203A (which represents an estimate of the speech or noise-invariant component of an input audio frame 202) to a ground truth frame 225A (which represents the speech or noise-invariant component of the same input audio frame 202, but with little or no noise). The loss calculator 224 may also be configured to determine an amount of loss (or error) in each output frame 203B relative to a respective ground truth frame 225B. For example, to determine a second loss, the loss calculator 224 may compare an output frame 203B (which represents an estimate of a SNR-related or noise-variant component of an input audio frame 202) to a ground truth frame 225B (which represents the SNR-related or noise-variant component of the same input audio frame 202). The loss calculator 224 may also be configured to determine additional losses based on the output frames 203A and 203B, ground truth frames 225A and 225B, and the input audio frames 202'. In some aspects, the loss calculator 224 may be configured to combine at least the first and second losses to determine a total loss 204. The loss calculator 224 may be further configured to output the total loss 204 to the network optimizer 226.

In some aspects, the network optimizer 226 may be configured to receive the total loss 204 and adjust one or more weights (also referred to as "parameters") 205 of the neural network 222 based on the total loss 204. More specifically, the network optimizer 226 may adjust the weights 205 in a manner that reduces the total loss 204. The machine learning system 200 may repeat the training process described above over one or more iterations until certain convergence criteria are met. For example, responsive to each new sequence of audio frames provided as inputs to the neural network 222, the loss calculator 224 may determine a total loss 204 based on outputs of the neural network 222, and the network optimizer 226 may further update the weights 205 based on the total loss 204.

Figure 3A:
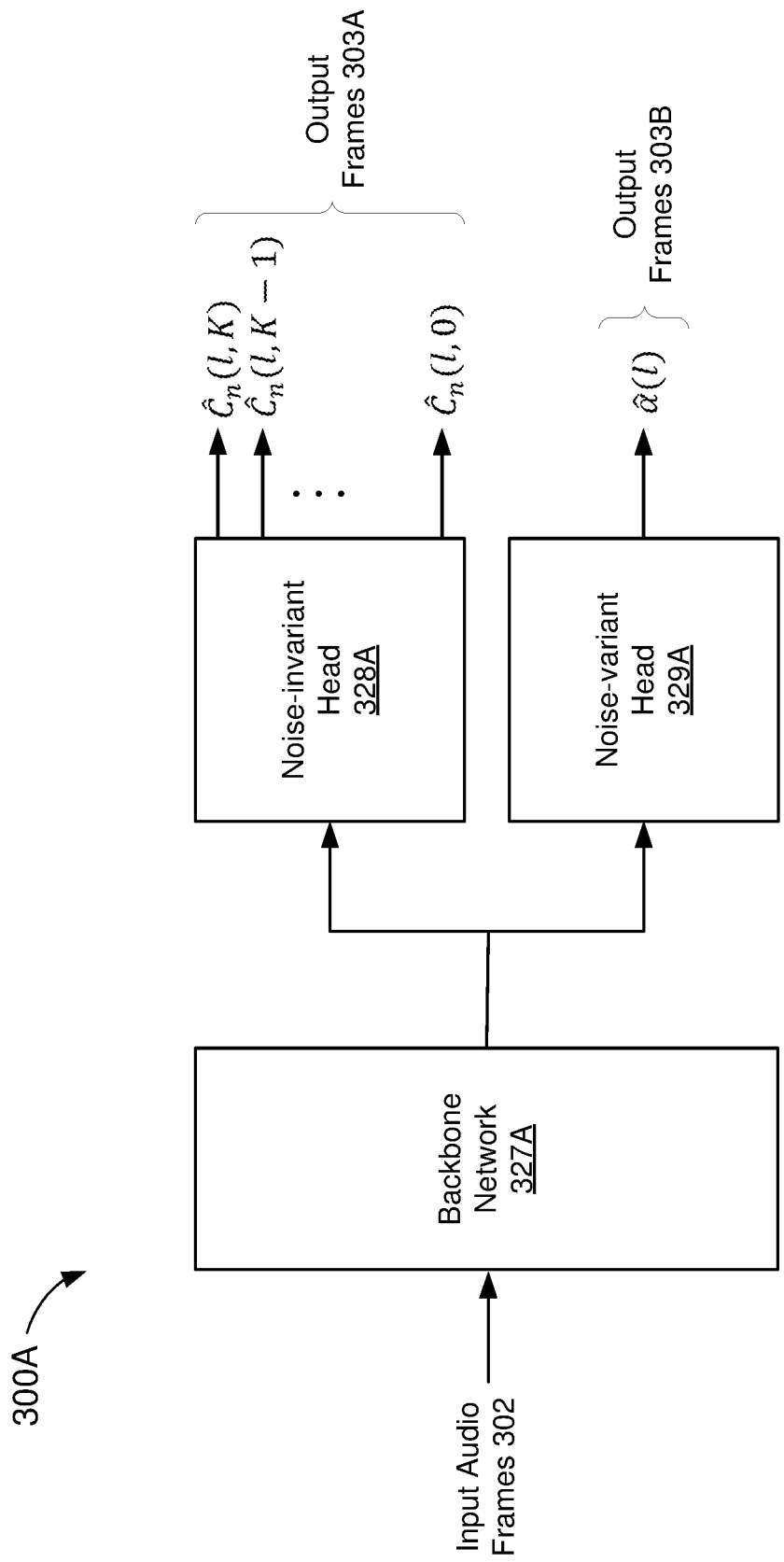
FIG. 3A shows a block diagram of an example neural network, according to some embodiments.

FIG. 3A shows a block diagram of an example neural network 300A, according to some embodiments. The neural network 300A may be an embodiment of the neural network 222 of FIG. 2. As illustrated in FIG. 3A, the neural network 300A includes a backbone network 327A, a noise-invariant head 328A, and a noise-variant head 329A. In some embodiments, the neural network 300A may include more than one noise-variant head 329A. Further, in some embodiments, each of the backbone network 327A, the noise-invariant head 328A, and the noise-variant head 329A may represent a separate neural network. In some aspects, each of the backbone network 327A, the noise-invariant head 328A, and the noise-variant head 329A may include multiple layers of artificial neurons (e.g., convolutional layers).

As shown in FIG. 3A, the backbone network 327A may be configured to receive a sequence of input audio frames 302. In some aspects, the input audio frames 302 may represent an audio signal that includes speech and noise. Further, in some embodiments, the input audio frames 302 may include the audio signal and/or various features related to the audio signal.

In some embodiments, the audio signal may be represented in the frequency domain as a sequence of audio frames (e.g., the sequence of input audio frames 302, the sequence of input audio frames 202 of FIG. 2 and/or the sequence of input audio frames 202' of FIG. 2). In such embodiments, the audio signal may be expressed as X(l,k), where l represents the frame index and k represents the frequency index.

In some aspects, the audio signal X(l,k) may be expressed (or modeled) as follows:

$$X(l,k) = C(l,k) + k \quad \text{(Equation 1)}$$

In Equation 1, C(l,k) represents the speech component (also referred to as a "clean speech signal" or "speech signal") of the audio signal X(l,k), and N(l,k) represents the noise component (also referred to as a "noise signal") of the audio signal X(l,k). The frame index l may range from 0 to L−1, where L represents the total number of frames in the sequence of audio frames. The frequency index k may range from 0 to K−1, where K represents the total number of frequency bins. In some embodiments, the audio signal X(l,k), but not the clean speech signal C(l,k) (in isolation) or the noise signal N(l,k) (in isolation), may be identified (or represented) in the input audio frames 302. Further, in some embodiments, the clean speech signal C(l,k) (and/or a variation of C(l,k) such as a normalized version of C(l,k)) may be included in a sequence of ground truth frames (e.g., the sequence of ground truth frames 225A of FIG. 2). Moreover, in some embodiments, the clean speech signal C(l,k) may be determined by a loss calculator (e.g., the loss calculator 224 of FIG. 2) using, for example, (i) a normalized version of C(l,k), which may be included in a sequence of ground truth frames (e.g., the sequence of ground truth frames 225A of FIG. 2); and (ii) the total energy of speech in the audio signal X(l,k), which may be included in or derived from a sequence of ground truth frames (e.g., the sequence of ground truth frames 225B of FIG. 2).

In some aspects, each of the clean speech signal C(l,k) and the audio signal X(l,k) may be formulated as follows:

$$C(l,k) = |C(l,k)| C_\theta(l,k) \quad \text{(Equation 2)}$$

$$X(l,k) = |X(l,k)| X_\theta(l,k) \quad \text{(Equation 3)}$$

In Equation 2, |C(l,k)| represents the magnitude of the clean speech signal C(l,k), and $C_\theta(l,k)$ represents the phase of the clean speech signal C(l,k). In Equation 3, |X(l,k)| represents the magnitude of the audio signal X(l,k), and $X_\theta(l,k)$ represents the phase of the audio signal X(l,k). In some embodiments, $C_\theta(l,k)$ and $X_\theta(l,k)$ may be used to determine ρ(l,k), a SNR-related phase of X(l,k) (e.g., a phase based on a difference between $C_\theta(l,k)$ and $X_\theta(l,k)$), which may be included in a sequence of ground truth frames (e.g., the sequence of ground truth frames 225B of FIG. 2).

In some aspects, each of the clean speech signal C(l,k) and the audio signal X(l,k) may be normalized using the L1 norm as follows:

$$\text{norm}_{L1}(C(l,k)) = C_n(l,k) = \frac{|C(l,k)|}{e_c(l)} \quad \text{(Equation 4)}$$

$$norm_{L1}(X(l,k)) = X_n(l,k) = \frac{|X(l,k)|}{e_x(l)} \quad \text{(Equation 5)}$$

In Equation 4, $C_n(l,k)$ represents the normalized clean speech signal $C(l,k)$, and $e_c(l)$ represents the total energy of the clean speech signal $C(l,k)$ at frame l. In Equation 5, $X_n(l,k)$ represents the normalized audio signal $X(l,k)$, and $e_x(l)$ represents the total energy of the audio signal $X(l,k)$ at frame l. In some embodiments, $C_n(l,k)$ may be included in a sequence of ground truth frames (e.g., the sequence of ground truth frames 225A of FIG. 2). Further, in some embodiments, $X_n(l,k)$ and $e_x(l)$ may be included in, for example, the sequence of input audio frames 202' of FIG. 2.

In some embodiments, $e_c(l)$ and $e_x(l)$ may be used to define a SNR-related gain (or ratio) $\alpha(l)$ of the audio signal $X(l,k)$ as shown below:

$$\alpha(l) = \frac{e_c(l)}{e_x(l)} \quad \text{(Equation 6)}$$

In some embodiments, the SNR-related gain $\alpha(l)$ may be included in a sequence of ground truth frames (e.g., the sequence of ground truth frames 225B of FIG. 2).

As described above, in some embodiments, the input audio frames 302 may include the audio signal $X(l,k)$. In some other embodiments, in addition to or in lieu of $X(l,k)$, the input audio frames 302 may include $I(l,k)$, a feature which represents the log-normalized frequency spectrum magnitude (also referred to as the "log-normalized spectrum magnitude") of the audio signal $X(l,k)$, as shown below:

$$I(l,k) = \log(X_n(l,k)) \quad \text{(Equation 7)}$$

By training the neural network 300A using $I(l,k)$, the neural network 300A may be better-suited (e.g., able to more precisely enhance speech) for far-field applications, where a speech source is located a distance from a microphone. In some embodiments, in addition to or as an alternative to $X(l,k)$ and/or $I(l,k)$, the input audio frames 302 may include any one or more of the following features:

$$d(l,k) = \log(X_n(l,k)) - \log(X_n(l-1,k)) \quad \text{(Equation 8)}$$

$$dd(l,k) = d(l,k) - d(l-1,k) \quad \text{(Equation 9)}$$

$$de(l) = \log(e_x(l)) - \log(e_x(l-1)) \quad \text{(Equation 10)}$$

In Equation 8, $d(l,k)$ represents a first derivative of the log-normalized spectrum magnitude $I(l,k)$. In Equation 9, $dd(l,k)$ represents a second derivative of the log-normalized spectrum magnitude $I(l,k)$, and in Equation 10, $de(l)$ represents a change in the log domain of $e_x(l)$, the total energy of the audio signal $X(l,k)$ for a frame (l). In some embodiments, two or more of the features, $I(l,k)$, $d(l,k)$, $dd(l,k)$, and $de(l)$, may be concatenated and input to the backbone network 327A as the input audio frames 302. By training the neural network 300A using two or more of the features, $I(l,k)$, $d(l,k)$, $dd(l,k)$, and $de(l)$, the neural network 300A may be better suited for far-field applications relative to using just one of the features.

Upon receiving the input audio frames 302, the backbone network 327A may analyze the input audio frames 302 using multiple layers of artificial neurons. In some embodiments, the backbone network 327A may extract features (e.g., rules) from the input audio frames 302, and output the extracted features as, for example, a feature map to the noise-invariant head 328A and the noise-variant head 329A.

As shown in FIG. 3A, the noise-invariant head 328A may use the feature map to generate the output frames 303A, which may include a normalized clean speech frequency spectrum magnitude (also referred to as a "normalized clean speech spectrum magnitude") $\hat{C}_n(l,k)$. The normalized clean speech spectrum magnitude $\hat{C}_n(l,k)$ may represent an estimate of $C_n(l,k)$, the normalized clean speech signal (defined above in Equation 4).

In some aspects, when the noise-invariant head 328A analyzes a frame l that contains only speech, the sum of values associated with the output frames 303A is 1, as shown below:

$$\sum_{k=0}^{K-1} \hat{C}_n(l,k) = 1 \text{ for } l \in \text{speech frames} \quad \text{(Equation 11)}$$

In contrast, when the noise-invariant head 328A analyzes a frame l that includes only noise, the sum of the values associated with the output frames 303A is 0, as shown below:

$$\sum_{k=0}^{K-1} \hat{C}_n(l,k) = 0 \text{ for } l \in \text{noise frames} \quad \text{(Equation 12)}$$

In some embodiments, the noise-invariant head 328A may include a softmax layer that generates K+1 outputs (e.g., $\hat{C}_n(l,0), \ldots, \hat{C}_n(l,K-1)$, and $\hat{C}_n(l,K)$, as shown in FIG. 3A), where the additional output (the +1 output) is used to detect noise-only frames.

As shown in FIG. 3A, the noise-variant head 329A may use the feature map from the backbone network 327A to generate output frames 303B, which include a SNR-related gain $\hat{\alpha}(l)$. The SNR-related gain $\hat{\alpha}(l)$ may represent an estimate of the SNR-related gain $\alpha(l)$ (defined above in Equation 6). In some embodiments, the noise-variant head 329A may include a sigmoid function, and output values of $\alpha(l)$ between, for example, 0 and 1.

In some aspects, the neural network 300A may be based on frequency spectrum magnitude (also referred to as "spectrum magnitude"), but not frequency spectrum phase (also referred to as "spectrum phase"). That is, the neural network 300A (e.g., the backbone network 327A, noise-invariant head 328A, and noise-variant head 329A) may analyze the spectrum magnitude (e.g. $|X(l,k)|$), but not the spectrum phase (e.g., $X_\theta(l,k)$), of the input audio frames 302. Consequently, the neural network 300A may output $\hat{C}_n(l,k)$, which is based on spectrum magnitude, and $\hat{\alpha}(l)$, which is also based on spectrum magnitude. Accordingly, the neural network 300A may be configured to generate K+2 outputs for each frame l (e.g., $\hat{C}_n(l,0), \ldots, \hat{C}_n(l,K-1), \hat{C}_n(l,K)$, and $\hat{\alpha}(l)$, as shown in FIG. 3A. Once the neural network 300A has generated the K+2 outputs for each frame l (or output frames 303A and 303B), the neural network 300A may provide the output frames 303A and 303B to a loss calculator, such as the loss calculator 224 described above with respect to FIG. 2.

Figure 3B:
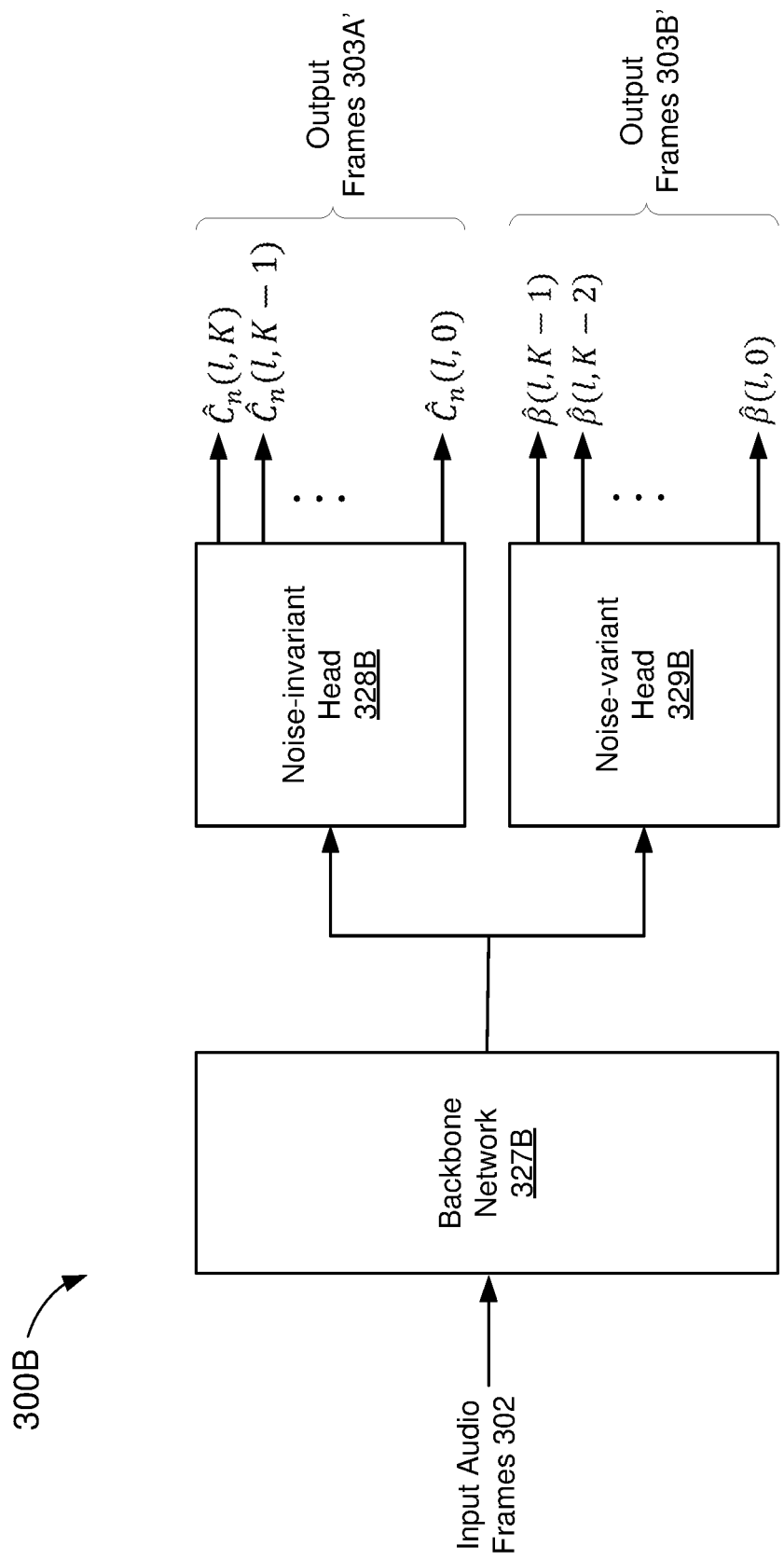
FIG. 3B shows a block diagram of an example neural network, according to some embodiments.

FIG. 3B shows a block diagram of an example neural network 300B, according to some embodiments. The neural network 300B may be an embodiment of the neural network 222 and/or 300A of FIGS. 2 and 3A, respectively. As illustrated in FIG. 3B, the neural network 300B includes a backbone network 327B, a noise-invariant head 328B, and a noise-variant head 329B. In some embodiments, the neural network 300B may include more than one noise-variant head 329B. Further, in some embodiments, each of the backbone 327B, the noise-invariant head 328B, and the noise-variant head 329B may represent a separate neural network. Further, in some aspects, each of the backbone network 327B, the noise-invariant head 328B, and the noise-variant head 329B may include multiple layers of artificial neurons (e.g., convolutional layers).

As shown in FIG. 3B, the backbone network 327B may be configured to receive a sequence of input audio frames 302. As discussed above with respect to FIG. 3A, the input audio frames 302 may represent the audio signal X(l,k), which includes speech and noise. In some embodiments, the input audio frames 302 may include X(l,k) and/or various features of X(l,k). With reference to Equation 1 above, the audio signal X(l,k) may be modeled as the sum of a clean speech signal C(l,k) and a noise signal N(l,k); and with reference to Equations 2 and 3 above, the audio signal X(l,k) may be formulated to include a magnitude |X(l,k)| and phase $X_\theta(l,k)$, and the clean speech signal C(l,k) may be formulated to include a magnitude |C(l,k)| and phase $C_\theta(l,k)$. In some embodiments, the phases, $X_\theta(l,k)$ and $C_\theta(l)$, and the SNR-related gain $\alpha(l,k)$ (defined above in Equation 6), may be used to define the following expressions for the audio signal X(l,k):

$$\rho(l,k) = \max(\cos(C_\theta(l,k) - X_\theta(l,k)), 0) \quad \text{Equation 13}$$

$$\beta(l,k) = \alpha(l)\rho(l,k) \quad \text{Equation 14}$$

In Equation 13, $\rho(l,k)$ may represent a SNR-related phase of the audio signal X(l,k), and range from 0 to 1. In Equation 14, $\beta(l,k)$ may represent a SNR-related phase-sensitive gain (also referred to as "phase sensitive gain") of the audio signal X(l,k). In some embodiments, (i) $\alpha(l)$, (ii) $\alpha(l)$ and $\rho(l,k)$, and/or (iii) $\beta(l,k)$ may be included in a sequence of ground truth frames (e.g., the sequence of ground truth frames 225B of FIG. 2).

Upon receiving the input audio frames 302, the backbone network 327B may analyze the input audio frames 302 using multiple layers of artificial neurons. In some embodiments, the backbone network 327B may extract features from the input audio frames 302, and output the extracted features as, for example, a feature map to the noise-invariant head 328B and the noise-variant head 329B.

The noise-invariant head 328B may use the feature map to generate output frames 303A'. In some embodiments, the output frames 303A' may include normalized clean speech spectrum magnitude $\hat{C}_n(l,k)$, which may represent an estimate of the normalized clean speech signal $C_n(l,k)$ (defined above in Equation 4). In some embodiments, the noise-invariant head 328B may include a softmax layer that generates K+1 outputs (e.g., $\hat{C}_n(l,0)$, ..., $\hat{C}_n(l,K-1)$, and $\hat{C}_n(l,K)$, as shown in FIG. 3B), where the additional output (the +1 output) is used to detect noise-only frames.

As shown in FIG. 3B, the noise-variant head 329B may use the feature map to generate output frames 303B'. In some embodiments, the output frames 303B' may include phase-sensitive gain $\hat{\beta}(l,k)$, which may represent an estimate of the phase-sensitive gain $\beta(l,k)$ (defined above in Equation 14). In such embodiments, the noise-variant head 329B may generate K outputs (e.g., $\hat{\beta}(l,0)$, ..., $\hat{\beta}(l,K-2)$, $\hat{\beta}(l,K-1)$), as shown in FIG. 3B.

In some other embodiments, the output frames 303B' may include SNR-related phase $\hat{\rho}(l,k)$ and SNR-related gain $\hat{\alpha}(l)$. The SNR-related phase $\hat{\rho}(l,k)$ may represent an estimate of the SNR-related phase $\rho(l,k)$ (defined above in Equation 13). The SNR-related gain $\hat{\alpha}(l)$ may represent an estimate of the SNR-related gain $\alpha(l)$ (defined above in Equation 6). In some embodiments, the noise-variant head 329B may include a sigmoid function, and output values of $\hat{\alpha}(l)$ between, for example, 0 and 1. In embodiments where the output frames 303B' include $\hat{\rho}(l,k)$ and $\hat{\alpha}(l)$, the noise-variant head 329B may generate K+1 outputs for a frame l (e.g., $\hat{\alpha}(l)$, $\hat{\rho}(l,0)$, ..., $\hat{\rho}(l,K-2)$, $\hat{\rho}(l,K-1)$).

In some aspects, the neural network 300B may be based on both spectrum magnitude and spectrum phase (unlike the neural network 300A of FIG. 3A, which may be based on spectrum magnitude but not spectrum phase). That is, the neural network 300B (e.g., the backbone network 327B, noise-invariant head 328B and noise-variant head 329B) may analyze both the spectrum magnitude (e.g. |X(l,k)|) and the spectrum phase (e.g., $X_\theta(l,k)$) of the input audio frames 302. Consequently, the neural network 300B may output $\hat{C}_n(l,k)$, which is based on spectrum magnitude, and either (i) $\hat{\beta}(l,k)$, which is based on spectrum phase and spectrum magnitude, or (ii) $\hat{\rho}(l,k)$, which is based on spectrum phase and $\hat{\alpha}(l)$, which is based on spectrum magnitude.

In embodiments where the noise-variant head 329B is configured to generate $\hat{\beta}(l,k)$, the neural network 300B may generate 2K+1 outputs (e.g., $\hat{C}_n(l,0)$, ..., $\hat{C}_n(l,K-1)$, $\hat{C}_n(l,K)$, and $\hat{\beta}(l,0)$, ..., $\hat{\beta}(l,K-2)$, $\hat{\beta}(l,K-1)$), as shown in FIG. 3B. In other embodiments where the noise-variant head 329B is configured to generate $\hat{\rho}(l,k)$ and $\hat{\alpha}(l)$, the neural network 300B may generate 2K+2 outputs (e.g., $\hat{C}_n(l,0)$, ..., $\hat{C}_n(l,K-1)$, $\hat{C}_n(l,K)$, $\hat{\alpha}(l)$, and $\hat{\rho}(l,0)$, ..., $\hat{\rho}(l,K-2)$, $\hat{\beta}(l,K-1)$). Once the neural network 300B has generated the outputs (or output frames 303A' and 303B'), the neural network 300B may provide the output frames 303A' and 303B' to a loss calculator, such as the loss calculator 224 described above with respect to FIG. 2.

Figure 4:
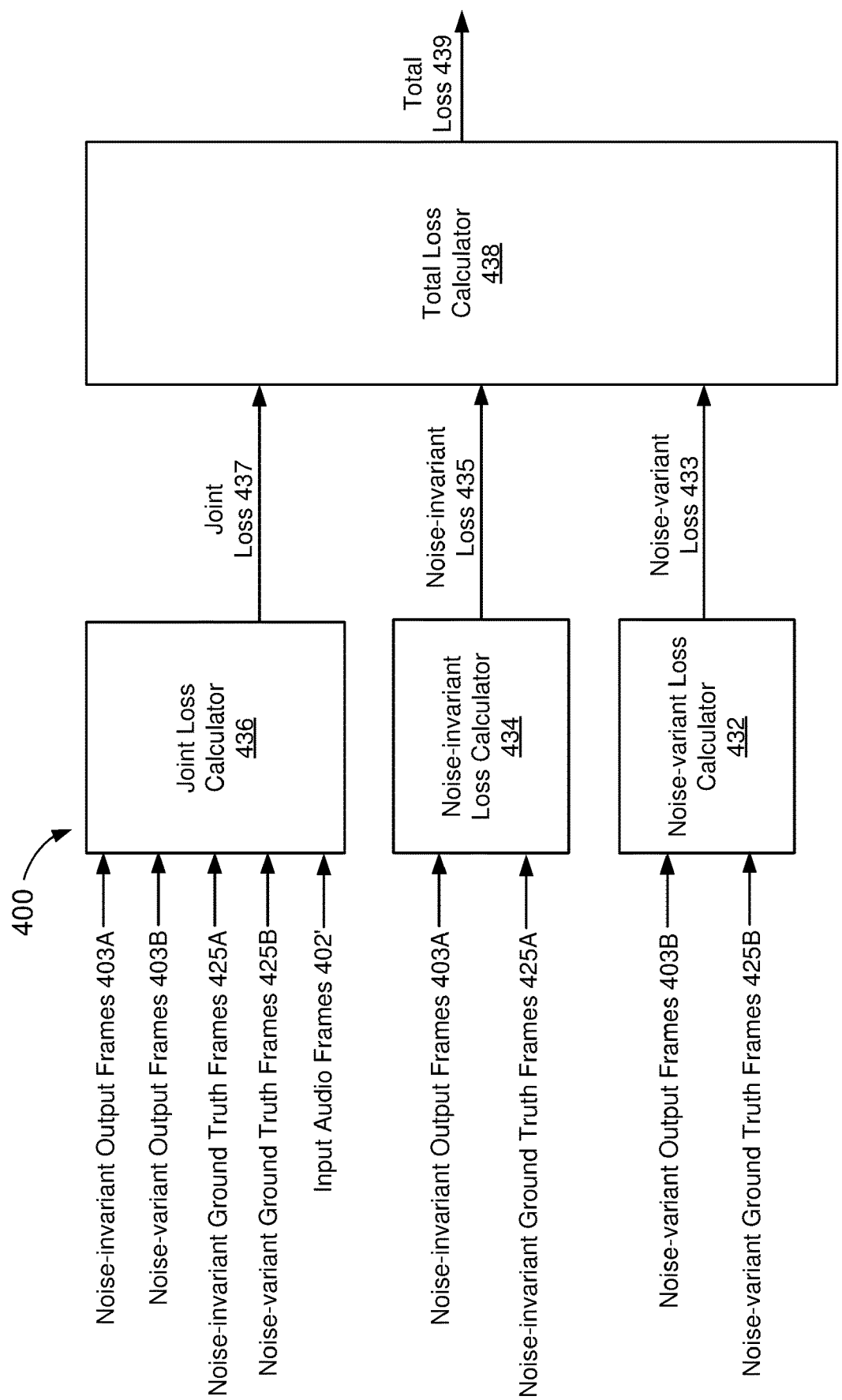
FIG. 4 shows a block diagram of an example loss calculator, according to some embodiments

FIG. 4 shows a block diagram of an example loss calculator 400, according to some embodiments. The loss calculator 400 may be an embodiment of the loss calculator 224 of FIG. 2. As shown in FIG. 4, the loss calculator 400 includes a noise-variant loss calculator 432, a noise-invariant loss calculator 434, a joint loss calculator 436, and a total loss calculator 438.

The Noise-Variant Loss Calculator

The noise-variant loss calculator 432 may be configured to receive a sequence of noise-variant output frames 403B from a neural network, such as the neural network 222, 300A, or 300B of FIGS. 2, 3A and 3B, respectively. In some embodiments, the noise-variant output frames 403B may be an embodiment of the output frames 303B of FIG. 3A, and each noise-variant output frame 403B may include SNR-related gain $\hat{\alpha}(l)$. As shown in FIG. 4, the noise-variant loss calculator 432 may also be configured to receive a sequence of noise-variant ground truth frames 425B. In some embodiments, the noise-variant ground truth frames 425B may be an embodiment of the ground truth frames 225B of FIG. 2, and each noise-variant ground truth frame 425B may include SNR-related gain $\alpha(l)$ (as defined above in Equation 6).

In some embodiments, the noise-variant loss calculator 432 may be configured to use the noise-variant output frames 403B ($\hat{\alpha}(l)$), and noise-variant ground truth frames 425B ($\alpha(l)$) to determine a noise-variant loss 433 (also referred to as "$L_{NV}$") as follows:

$$L_{NV} = \sum_l w_v(l) |\alpha(l) - \hat{\alpha}(l)|^p \quad \text{Equation 15.1}$$

In Equation 15.1, the noise-variant loss $L_{NV}$ is a mean squared error (MSE) loss that represents an amount of error in the noise-variant output frames 403B ($\hat{\alpha}(l)$) relative to the noise-variant ground truth frames 425B ($\alpha(l)$). $w_v(l)$ is a frame-based weight that may be set to a value of 1 or $e_x(l)$ (described above with reference to Equation 5). p may be set to a value of 1 or 2.

In some other embodiments, the noise-variant loss calculator 432 may be configured to determine the noise-variant loss 433 ($L_{NV}$) as follows:

$$L_{NV} = -\sum_l w_v(l)\left(\alpha(l)\log\left(\frac{\hat{\alpha}(l)}{\alpha(l)+\varepsilon}\right) + \alpha_0(l)\log\left(\frac{\hat{\alpha}_0(l)}{\alpha_0(l)+\varepsilon}\right)\right) \quad \text{Equation 15.2}$$

In Equation 15.2, the noise-variant loss $L_{NV}$ is a Kullback-Leibler (KL) loss that represents an amount of error in the noise-variant output frames 403B ($\hat{\alpha}(l)$) relative to the noise-variant ground truth frames 425B ($\alpha(l)$). $w_v(l)$ is a frame-based weight that may be set to a value of 1 or $e_x(l)$ (described above with reference to Equation 5). $\varepsilon$ is a parameter used for numerical stability, and is based on the smallest value that may be handled by hardware and software. In some embodiments, $\varepsilon$ may be set to $1\times10^{-12}$. Further, $\alpha_0(l)$ represents the difference between 1 and $\hat{\alpha}(l)$; and $\hat{\alpha}_0(l)$ represents the difference between 1 and $\hat{\alpha}(l)$.

In some other embodiments, the noise-variant output frames 403B may be an embodiment of the output frames 303B' of FIG. 3B and include $\hat{\beta}(l,k)$. In such embodiments, the noise-variant ground truth frames 425B may be an embodiment of the ground truth frames 225B of FIG. 2 and include $\beta(l,k)$ (defined above in Equation 14). Further, the noise-variant loss calculator 432 may be configured to use the noise-variant output frames 403B (e.g., $\hat{\beta}(l,k)$), and noise-variant ground truth frames 425B ($\beta(l,k)$) to determine a noise-variant loss 433 ($L_{NV}$) as follows:

$$L_{NV} = \sum_l \sum_{k=0}^{K-1} w_{v1}(l,k)|\beta(l,k) - \hat{\beta}(l,k)|^p \quad \text{Equation 15.3}$$

In Equation 15.3, the noise-variant loss $L_{NV}$ is a MSE loss that represents an amount of error in the noise-variant output frames 403B ($\hat{\beta}(l,k)$) relative to the noise-variant ground truth frames 425B ($\beta(l,k)$). $w_{v1}(l,k)$ is a frame and frequency-based weight that may set to a value of 1 or $(\lambda_i+e_x(l))*(X_n(l,k))$, where $\lambda_i$ is a hyperparameter that may be used for tuning and set to a value greater than or equal to 0, $e_x(l)$ represents a total energy of the audio signal X(l,k) for a frame l (as discussed above with reference to Equation 5), and $X_n(l,k)$ represents the normalized audio signal X(l,k) (defined above in Equation 5). p may be set to a value of 1 or 2.

In some other embodiments, the noise-variant loss calculator 432 may be configured to determine the noise-variant loss 433 ($L_{NV}$) as follows:

$$L_{NV} = \sum_l \sum_{k=0}^{K-1} w_{v1}(l,k)\left(\beta(l,k)\log\left(\frac{\hat{\beta}(l,k)}{\beta(l,k)+\varepsilon}\right) + \beta_0(l,k)\log\left(\frac{\hat{\beta}_0(l,k)}{\beta_0(l,k)+\varepsilon}\right)\right) \quad \text{Eqn. 15.4}$$

In Equation 15.4, the noise-variant loss $L_{NV}$ is a KL loss that represents an amount of error in the noise-variant output frames 403B ($\hat{\beta}(l,k)$) relative to the noise-variant ground truth frames 425B ($\beta(l,k)$). $w_{v1}(l,k)$ is a frame and frequency-based weight that may set to a value of 1 or $(\lambda_i+e_x(l))*(X_n(l,k))$, as described above with respect to Equation 15.3. $\varepsilon$ is a parameter that may be set to $1\times10^{-12}$, as described above with respect to Equation 15.2. Further, $\beta_0(l,k)$ represents the difference between 1 and $\beta(l,k)$; and $\hat{\beta}_0(l,k)$ represents the difference between 1 and $\hat{\beta}(l,k)$.

The Noise-Invariant Loss Calculator

The noise-invariant loss calculator 434 may be configured to receive a sequence of noise-invariant output frames 403A from a neural network, such as the neural network 222, 300A, or 300B of FIGS. 2, 3A, and 3B, respectively. In some embodiments, the noise-invariant output frames 403A may be an embodiment of the output frames 303A or 303A' of FIGS. 3A and 3B, respectively, and include $\hat{C}_n(l,k)$. As shown in FIG. 4, the noise-invariant loss calculator 434 may be configured to receive a sequence of noise-invariant ground truth frames 425A. In some embodiments, the noise-invariant ground truth frames 425A may be an embodiment of the ground truth frames 225A of FIG. 2 and include $C_n(l,k)$ (defined above in Equation 4).

In some embodiments, the noise-invariant loss calculator 434 may be configured to use the noise-invariant output frames 403A ($\hat{C}_n(l,k)$), and noise-invariant ground truth frames 425A ($C_n(l,k)$) to determine a noise-invariant loss (also referred to as "$L_{NI}$") 435 as follows:

$$L_{NI} = \sum_l \sum_{k=0}^{K-1} |\hat{C}_n(l,k) - C_n(l,k)|^p \quad \text{Equation 16.1}$$

In Equation 16.1, the noise-invariant loss $L_{NI}$ is a MSE loss that represents an amount of error in the noise-invariant output frames 403A ($\hat{C}_n(l,k)$) relative to the noise-invariant ground truth frames 425A ($C_n(l,k)$). p may be set to a value of 1 or 2.

In some other embodiments, the noise-invariant loss calculator 434 may be configured to determine the noise-invariant loss 435 ($L_{NI}$) as follows:

$$L_{NI} = \begin{cases} -\sum_l \log\left(\hat{C}_n(l,K)\right) & l \in \text{noise frames} \\ -\sum_l \sum_{k=0}^{K-1} C_n(l,k)\log\left(\frac{\hat{C}_n(l,k)}{C_n(l,k)+\varepsilon}\right) & l \in \text{speech frames} \end{cases} \quad \text{Equation 16.2}$$

In Equation 16.2, the noise-invariant loss $L_{NI}$ is a KL loss that represents an amount of error in the noise-invariant output frames 403A ($\hat{C}_n(l,k)$) relative to the noise-invariant ground truth frames 425A ($C_n(l,k)$). E is a parameter that may be set to $1\times10^{-12}$, as described above with respect to Equation 15.2.

Joint Loss Calculator

In some embodiments, the joint loss calculator 436 may be configured to receive the noise-invariant output frames 403A (e.g., $\hat{C}_n(l,k)$) and the noise-variant output frames 403B (e.g., $\hat{\alpha}(l,k)$; $\alpha(l,k)$ and $\hat{\rho}(l,k)$; or $\hat{\beta}(l,k)$). The joint loss calculator 436 may also be configured to receive the noise-invariant ground truth frames 425A (e.g., C(l,k)) and the noise-variant ground truth frames 425B (e.g., α(l); α(l) and ρ(l,k); or β(l,k)). Moreover, in some embodiments, the joint loss calculator 436 may be configured to receive a sequence of input audio frames 402', which may be an embodiment of the input audio frames 202' of FIG. 2, and include, for example, X(l,k), $X_n$(l,k), and/or $e_x$(l). Further, in some embodiments, the joint loss calculator 436 may be configured to use the noise-invariant output frames 403A, the noise-variant output frames 403B, the noise-invariant ground truth frames 425A, the noise-variant ground truth frames 425B, and the input audio frames 402', to determine an estimated gain Ĝ(l,k) and ground truth gain G(l,k), and in turn, a joint loss 437.

In some embodiments, the joint loss calculator 436 may be configured to use the noise-invariant output frames 403A ($Ĉ_n$(l,k)), the noise-variant output frames 403B ($\hat{α}$(l,k)), and the input audio frames 402' (e.g., ($X_n$(l,k)) to determine an estimated gain Ĝ(l,k), as follows:

$$\hat{G}(l, k) = \hat{α}(l)\frac{|\hat{C}_n(l, k)|}{|X_n(l, k)|} \quad \text{Equation 17.1}$$

In such embodiments, the joint loss calculator 436 may also be configured to use the noise-invariant ground truth frames 425A (C(l,k)) and input audio frames 402' (X(l,k)) to determine a ground truth gain G(l,k), as follows:

$$G(l, k) = \frac{|C(l, k)|}{|X(l, k)|} \quad \text{Equation 18.1}$$

In some aspects, the estimated gain Ĝ(l,k) and ground truth gain G(l,k) defined above in Equations 17.1 and 18.1, respectively, are each based on spectrum magnitude, and may each take on values between 0 and 1.

In some other embodiments, the joint loss calculator 436 may be configured to use the noise-invariant output frames 403A ($\hat{C}_n$(l,k)), the noise-variant output frames 403B ($\hat{α}$(l,k) and $\hat{ρ}$(l,k)), and the input audio frames 402' (e.g., ($X_n$(l,k)) to determine an estimated gain Ĝ(l,k), as follows:

$$\hat{G}(l, k) = \hat{α}(l)\hat{ρ}(l, k)\frac{|\hat{C}_n(l, k)|}{|X_n(l, k)|} \quad \text{Equation 17.2}$$

In such embodiments, the joint loss calculator 436 may further be configured to use the noise-invariant ground truth frames 425A (C(l,k))), the noise-variant ground truth frames 425B (ρ(l,k)), and input audio frames 402' (X(l,k)) to determine a ground truth gain G(l,k), as follows:

$$G(l, k) = \frac{|C(l, k)|}{|X(l, k)|}ρ(l, k) \quad \text{Equation 18.2}$$

In some aspects, the estimated gain Ĝ(l,k) and ground truth gain G(l,k) defined above in Equations 17.2 and 18.2, respectively, are each based on spectrum magnitude and spectrum phase, and may each take on values between 0 and 1.

Once the joint loss calculator 436 has determined Ĝ(l,k) and G(l,k) (using Equations 17.1 and 18.1, respectively; or Equations 17.2 and 18.2, respectively), the joint loss calculator 436 may determine the difference between G(l,k) and Ĝ(l,k) (also referred to as the gain difference "δ(l,k)"), as follows:

$$δ(l,k) = G(l,k) - \hat{G}(l,k) \quad \text{Equation 19}$$

In some embodiments, to determine the gain difference δ(l,k) in Equation 19, the joint loss calculator 436 may use Ĝ(l,k) and G(l,k), as defined above in Equations 17.1 and 18.1, respectively; or in Equations 17.2 and 18.2, respectively.

In some embodiments, once the joint loss calculator 436 has determined the gain difference δ(l,k) using Equation 19, the joint loss calculator 436 may normalize the gain difference δ(l,k) using the L2 norm to determine a gain difference loss (also referred to as "Δ(l,k)"), as follows:

$$Δ(l,k) = |δ(l,k)|^2 \quad \text{Equation 20.1}$$

In some aspects, the gain difference loss Δ(l,k), as defined in Equation 20.1, is related to MSE loss, and represents a loss that is symmetric (e.g., a loss in which the amount of distortion introduced to speech by a neural network, or the amount of noise suppression resulting from a neural network, is symmetric).

In some other embodiments, the joint loss calculator 436 may normalize the gain difference δ(l,k) using the L1 norm to determine the gain difference loss Δ(l,k), as follows:

$$Δ(l,k) = |δ(l,k)| \quad \text{Equation 20.2}$$

In some aspects, the gain difference loss Δ(l,k), as defined in Equation 20.2, is related to MSE loss and symmetric.

In some embodiments, the joint loss calculator 436 may determine a gain difference loss Δ(l,k) that is related to MSE loss, and non-symmetric (e.g., a loss in which the amount of distortion introduced to speech by a neural network, or the amount of noise suppression resulting from a neural network, is not symmetric), when calculated as follows:

$$Δ(l, k) = \begin{cases} γ_{mse}(G(l, k) - \hat{G}(l, k)) & G(l, k) - \hat{G}(l, k) \geq 0 \\ G(l, k) - \hat{G}(l, k) & G(l, k) - \hat{G}(l, k) < 0 \end{cases} \quad \text{Equation 20.3}$$

In Equation 20.3, $γ_{mse}$ represents a hyperparameter that may be tuned to emphasize (or de-emphasize) speech distortion, and may be set to a value greater than or equal to 1. In some embodiments, to determine the gain difference loss Δ(l,k) using Equation 20.3, the joint loss calculator 436 may use Ĝ(l,k) and G(l,k), as defined above in Equations 17.1 and 18.1, respectively, or as defined above in Equations 17.2 and 18.2, respectively.

Further, in some other embodiments, the joint loss calculator 436 may calculate a gain difference loss Δ(l,k) that is related to KL loss and symmetric, as follows:

$$Δ(l, k) = -G(l, k)\left(\log\left(\frac{\hat{G}(l, k)}{G(l, k) + ε}\right)\right) - G_0(l, k)\left(\log\left(\frac{\hat{G}_0(l, k)}{G_0(l, k) + ε}\right)\right) \quad \text{Equation 20.4}$$

In some embodiments, to determine the gain difference loss Δ(l,k) using Equation 20.4, the joint loss calculator 436 may use Ĝ(l,k) and G(l,k), as defined above in Equations 17.1 and 18.1, respectively. In such embodiments, the joint loss calculator 436 may calculate $G_0$(l,k) as the difference between 1 and G(l,k) (defined above in Equation 18.1), and the joint loss calculator 436 may calculate $\hat{G}_0(l,k)$ as the difference between 1 and $\hat{G}(l,k)$ (defined above in Equation 17.1). In some other embodiments, to determine the gain difference loss $\Delta(l,k)$ using Equation 20.4, the joint loss calculator 436 may use $\hat{G}(l,k)$ and $G(l,k)$ as defined above in Equations 17.2 and 18.2, respectively. In such embodiments, the joint loss calculator 436 may calculate $G_0(l,k)$ as the difference between 1 and $G(l,k)$ (defined above in Equation 18.2), and the joint loss calculator 436 may calculate $\hat{G}_0(l,k)$ as the difference between 1 and $\hat{G}(l,k)$ (defined above in Equation 17.2). Further, in some embodiments, $\varepsilon$ may be set to $1 \times 10^{-12}$ (as described above with respect to Equation 15.2).

In some other embodiments, the joint loss calculator 436 may calculate a gain difference loss $\Delta(l,k)$ that is related to KL loss and non-symmetric, as follows:

$$\Delta(l, k) = -G(l, k) \left(\log (\sigma(l, k))\right) - G_0(l, k) \left(\log \left(\frac{\hat{G}_0(l, k)}{G_0(l, k) + \varepsilon}\right)\right) \quad \text{Equation 20.5}$$

In some embodiments, to determine the gain difference loss $\Delta(l,k)$ of Equation 20.5, the joint loss calculator 436 may use $G(l,k)$, as defined above in Equation 18.1. In such embodiments, the joint loss calculator 436 may calculate $G_0(l,k)$ as the difference between 1 and $G(l,k)$ (defined above in Equation 18.1), and the joint loss calculator 436 may calculate $\hat{G}_0(l,k)$ as the difference between 1 and $\hat{G}(l,k)$ (defined above in Equation 17.1). In some other embodiments, to determine the gain difference loss $\Delta(l,k)$ of Equation 20.5, the joint loss calculator 436 may use $G(l,k)$ as defined above in Equation 18.2. In such embodiments, the joint loss calculator 436 may calculate $G_0(l,k)$ as the difference between 1 and $G(l,k)$ (defined above in Equation 18.2), and the joint loss calculator 436 may calculate $\hat{G}_0(l,k)$ as the difference between 1 and $\hat{G}(l,k)$ (defined above in Equation 17.2). Further, in some embodiments, $\varepsilon$ may be set to $1 \times 10^{-12}$ (as described above with respect to Equation 15.2), and $\sigma(l,k)$ may be determined as follows:

$$\sigma(l, k) = \begin{cases} \gamma_{KL}\left(\frac{\hat{G}(l, k)}{G(l, k) + \varepsilon}\right) & \frac{\hat{G}(l, k)}{G(l, k) + \varepsilon} \leq 1 \\ \left(\frac{\hat{G}(l, k)}{G(l, k) + \varepsilon}\right) & \frac{\hat{G}(l, k)}{G(l, k) + \varepsilon} > 1 \end{cases} \quad \text{Equation 20.5.1}$$

In Equation 20.5.1, $\gamma_{KL}$ represents a hyperparameter that may be tuned to emphasize (or de-emphasize) speech distortion, and may be set to a value less than or equal to 1. $\varepsilon$ may be set to $1 \times 10^{-12}$, as described above with respect to Equation 15.2. Further, in some embodiments, the joint loss calculator 436 may determine $\hat{G}(l,k)$ and $G(l,k)$ using Equations 17.1 and 18.1, respectively; and in some other embodiments, the joint loss calculator 436 may determine $\hat{G}(l,k)$ and $G(l,k)$ using Equations 17.2 and 18.2, respectively.

Once the joint loss calculator 436 has determined the gain difference loss $\Delta(l,k)$ using any of Equations 20.1-20.5, the joint loss calculator 436 may determine a weight to apply to the gain difference loss $\Delta(l,k)$. For example, in some embodiments, the joint loss calculator 436 may determine a weight $w(l,k)$ using the input audio frames 402' (e.g., $X(l,k)$ and $X_n(l,k)$) as follows:

$$w(l,k)=(\lambda_j X_n(l,k)+|X(l,k)|) \quad \text{Equation 26.1}$$

In Equation 26.1, $\lambda_j$ is a hyperparameter that may be used for tuning.

Further, in some embodiments, the joint loss calculator 436 may determine the weight $w(l,k)$ using the input audio frames 402' (e.g., $|X(l,k)|$, $X_n(l,k)$, and $e_x(l)$) and the hyperparameter $\lambda_j$ as follows:

$$w(l,k)=(\lambda_j+e_x(l))X_n(l,k) \quad \text{Equation 26.2}$$

In some aspects, the weight $w(l,k)$ defined above in Equation 26.1 is equivalent to the weight $w(l,k)$ defined above in Equation 26.2. That is, $w(l,k)=(\lambda_j X_n(l,k)+|X(l,k)|)=(\lambda_j+e_x(l))X_n(l,k)$.

Further, in some embodiments, the joint loss calculator 436 may set the weight $w(l,k)$ to a value of 1. Once the joint loss calculator 436 has determined the weight $w(l,k)$ using Equation 26.1 or 26.2, or by setting $w(l,k)$ to a value of 1, the joint loss calculator 436 may apply the weight $w(l,k)$ to the gain difference loss $\Delta(l,k)$ to determine a weighted gain difference loss $(\overline{\Delta}(l,k))$ as follows:

$$\overline{\Delta}(l,k)=w(l,k)\Delta(l,k) \quad \text{Equation 27.1}$$

After determining the weighted gain difference loss $\overline{\Delta}(l,k)$, the joint loss calculator 436 may calculate the joint loss 437 (also referred to as "$L_{joint}$") by summing the weighted gain difference loss $\overline{\Delta}(l,k)$ across each of the frequency bins and frames, as follows:

$$L_{joint} = \sum_{l}\sum_{k=0}^{K-1}\overline{\Delta}(l, k) \quad \text{Equation 28.1}$$

In some embodiments, the joint loss calculator 436 may apply a filterbank (e.g., a Mel, equivalent rectangular bandwidth, or Gammatone filterbank) to the weighted gain difference loss $\overline{\Delta}(Lk)$, where the filterbank may be represented as a matrix M with dimensions of Q bands×K frequency bins, as follows:

$$\overline{\Delta}_m(l, q) = \sum_{k=0}^{K-1}M(q, k)\overline{\Delta}(l, k) \; \forall \, l \quad \text{Equation 27.2}$$

In Equation 27.2, q represents a band index and ranges from 0 to Q, and k represents a frequency index and ranges from 0 to K−1. After applying the filterbank M to the weighted gain difference loss $\overline{\Delta}(l,k)$, the joint loss calculator 436 may calculate the joint loss 437 as follows:

$$L_{joint} = \sum_{l}\sum_{q=0}^{Q-1}\overline{\Delta}_m(l, q) \quad \text{Equation 28.2}$$

Total Loss Calculator

In some embodiments, the total loss calculator 438 may receive each of the noise-variant loss 433 ($L_{NV}$), the noise-invariant loss 435 ($L_{NI}$), and the joint loss 437 ($L_{joint}$), as shown in FIG. 4. Further, the total loss calculator 438 may combine each of the noise-variant loss 433, the noise-invariant loss 435, and the joint loss 437 to determine a total loss 439 ($L_{total}$) as follows:

$$L_{total}=L_{joint}+\lambda_t L_{individual} \quad \text{Equation 29}$$

In Equation 29, $L_{individual}$ represents each of the noise-variant loss 433 and the noise-invariant loss 435, and $\lambda_t$ represents a hyperparameter that may be used to balance $L_{joint}$ and $L_{individual}$. It is noted that each of the total loss 439, the joint loss 437, the noise-variant loss 433, and the noise-invariant loss 435 may be defined differently from the embodiments described herein.

Once the total loss 439 ($L_{total}$) is determined using Equation 29, a network optimizer (such as the network optimizer 226 of FIG. 2) may use the total loss 439 to determine whether certain convergence criteria are met. For example, where the total loss 439 falls below a threshold level, and/or where a predetermined number of training iterations has been completed, the network optimizer may determine that a neural network (e.g., the neural network 222 of FIG. 2, or the neural network 300A or 300B of FIGS. 3A and 3B, respectively) is optimized. Accordingly, the network optimizer may not update the weights (e.g., the weights 205 of FIG. 2) of the neural network. As another example, where the total loss 439 is above a threshold level, and/or where a predetermined number of training iterations has not yet been completed, the network optimizer may determine that the neural network is not yet optimized. Thus, the network optimizer may determine one or more weights that minimize the total loss 439 in order to update the weights of the neural network.

Figure 5:
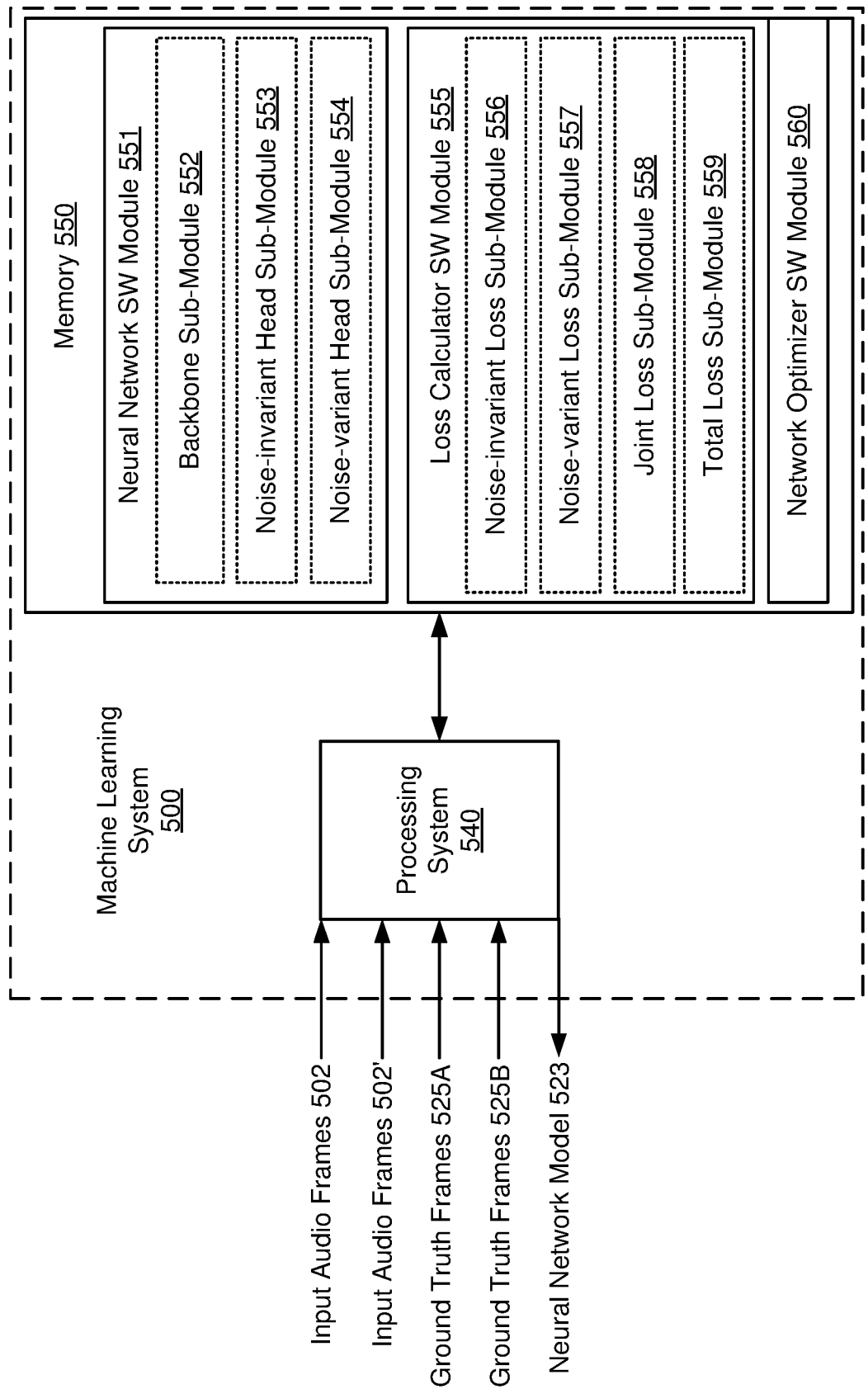
FIG. 5 shows an example machine learning system, according to some embodiments.

FIG. 5 shows an example machine learning system 500, according to some embodiments. In some embodiments, the machine learning system 500 may be one example of the machine learning system 200 of FIG. 2. Thus, the machine learning system 500 may be configured to produce a neural network model 523 based on a sequence of input audio frames 502, a sequence of input audio frames 502', a sequence of ground truth frames 525A and a sequence of ground truth frames 525B. In some aspects, the input audio frames 502 may be an embodiment of the input audio frames 202 of FIG. 2 and/or the input audio frames 302 of FIGS. 3A and 3B; and the ground truth frames 525A and 525B may be embodiments of the ground truth frames 225A and 225B, respectively, of FIG. 2, or the ground truth frames 425A and 425B, respectively, of FIG. 4. In some embodiments, the machine learning system 500 may include a processing system 540 and a memory 550.

The memory 550 may include a non-transitory computer-readable medium (including one or more nonvolatile memory elements, such as EPROM, EEPROM, Flash memory, a hard drive, and the like) that may store at least the following software (SW) modules:
  a neural network SW module 551 configured to create representations of the noise-invariant and noise-variant components of the input audio frames 502 (e.g., a sequence of noise-invariant output frames and a sequence of noise-variant output frames) by attempting to recreate the ground truth frames 525A and the ground truth frames 525B, to train the neural network model 523, the neural network SW module 551 including:
    a backbone sub-module 552 to determine features (or a feature map) of the input audio frames 502;
    a noise-invariant head sub-module 553 to determine an estimate of the noise-invariant component of the input audio frames 502 based on the feature map; and
    a noise-variant head sub-module 554 to determine an estimate of the noise-variant component of the input audio frames 502 based on the feature map.
  a loss calculator SW module 555 configured to determine a total amount of loss based on the sequence of noise-invariant output frames, the sequence of noise-variant output frames, the ground truth frames 525A and 525B, and the input audio frames 502', the loss calculator SW module 555 further including:
    a noise-invariant loss sub-module 556 to determine a noise-invariant loss based on the sequence of noise-invariant output frames and the ground truth frames 525A;
    a noise-variant loss sub-module 557 to determine a noise-variant loss based on the sequence of noise-variant output frames and the ground truth frames 525B;
    a joint loss sub-module 558 to determine a joint loss based on the sequence of noise-invariant output frames, the sequence of noise-variant output frames, the ground truth frames 525A and 525B, and the input audio frames 502'; and
    a total loss sub-module 559 to determine a total loss based on the joint loss, the noise-invariant loss, and the noise-variant loss; and
  a network optimizer SW module 560 configured to determine one or more updated weights of the neural network SW module 551 based on the total loss.

Each software module includes instructions that, when executed by the processing system 540, cause the machine learning system 500 to perform the corresponding functions.

The processing system 540 may include any suitable one or more processors capable of executing scripts or instructions of one or more software programs stored in the machine learning system 500 (such as in memory 550). For example, the processing system 540 may execute the neural network SW module 551 to create representations of speech (e.g., a clean speech signal) and SNR-related information of the sequence of input audio frames 502 by attempting to recreate the ground truth frames 525A and 525B, respectively. Put differently, the processing system 540 may execute the neural network SW module 551 to map the sequence of input audio frames 502 to both a sequence of noise-invariant output frames and a sequence of noise-variant output frames.

In executing the neural network SW module 551, the processing system 540 may further execute the backbone sub-module 552, the noise-invariant head sub-module 553, and the noise-variant head sub-module 554. For example, the processing system 540 may execute the backbone sub-module 552 to determine a feature map of the input audio frames 502. The processing system 540 may also execute the noise-invariant head sub-module 553 to determine the sequence of noise-invariant output frames based on the feature map. The processing system 540 may further execute the noise-variant head sub-module 554 to determine the sequence of noise-variant output frames based on the feature map.

The processing system 540 may also execute the loss calculator SW module 555 to determine a total loss. In executing the loss calculator SW module 555, the processing system 540 may further execute the noise-invariant loss sub-module 556, the noise-variant loss sub-module 557, the joint loss sub-module 558, and the total loss sub-module 559. For example, the processing system 540 may execute the noise-invariant loss sub-module 556 to determine a noise-invariant loss. The processing system 540 may also execute the noise-variant loss sub-module 557 to determine a noise-variant loss. Further, the processing system 540 may execute the joint loss sub-module 558 to determine a joint loss. The processing system 540 may also execute the total loss sub-module 559 to determine a total loss. In some embodiments, the processing system 540 may further execute the network optimizer SW module 560 to determine updated weights (or parameters) of the neural network SW module 551 based on the total loss.

Figure 6:
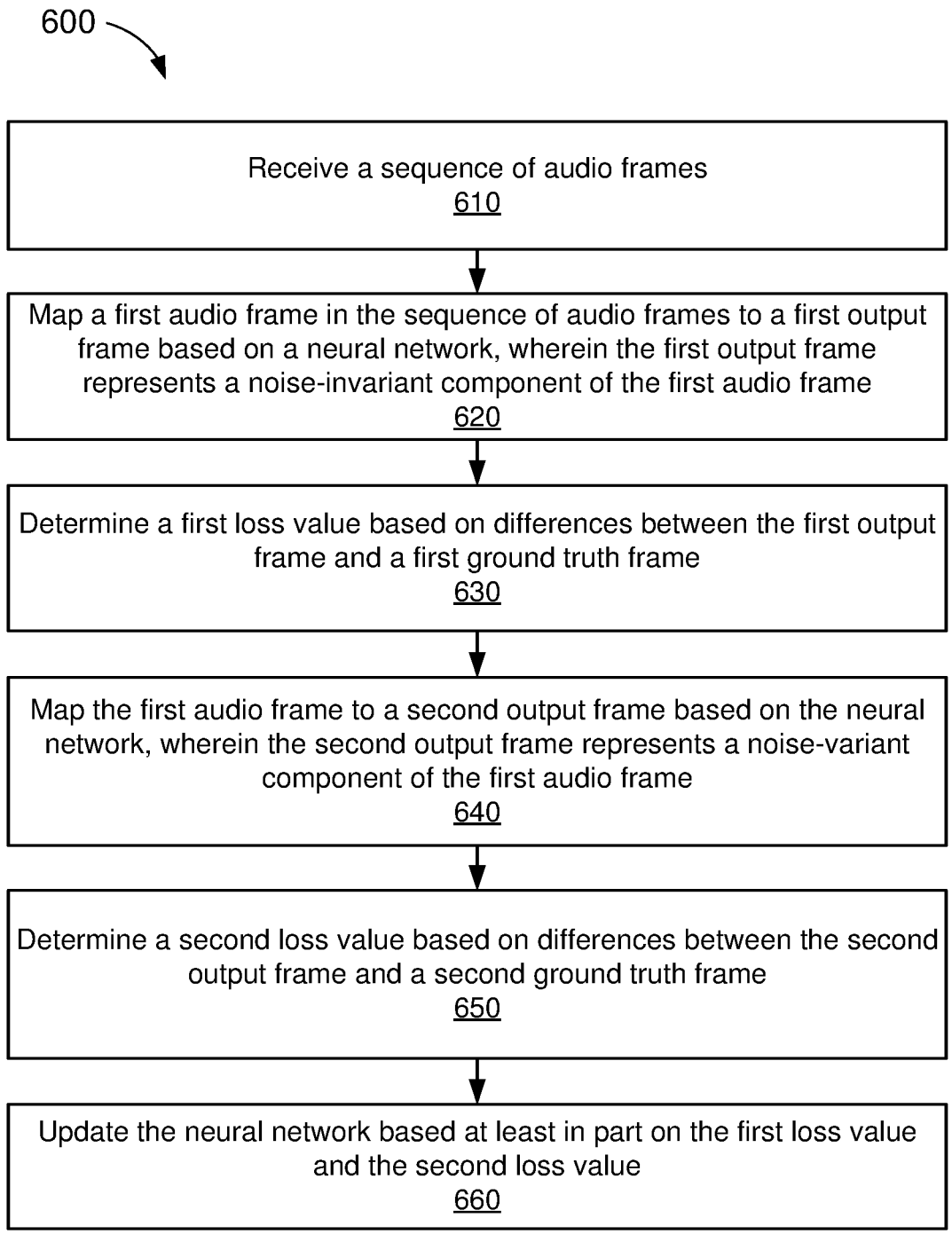
FIG. 6 shows an illustrative flowchart depicting an example operation for training neural networks, according to some embodiments.

FIG. 6 shows an illustrative flowchart depicting an example operation 600 for training neural networks, according to some embodiments. The example operation 600 may be performed by a machine learning system (such as the machine learning system 200 and/or 500 of FIGS. 2 and 5, respectively) to train a neural network to infer representations of speech (e.g., a clean speech signal) and SNR-related information in a sequence of audio frames.

As shown in FIG. 6, the machine learning system may receive a sequence of audio frames (610). In some embodiments, the sequence of audio frames may represent, in the frequency domain, an audio signal that includes a noise-invariant component and a noise-variant component. The machine learning system may map a first audio frame in the sequence of audio frames to a first output frame based on a neural network, where the first output frame may represent the noise-invariant component of the first audio frame (620). In some embodiments, the first audio frame may include multiple sub-frames, where each of the sub-frames is associated with a respective frequency bin. Further, in some embodiments, the first audio frame may be normalized based on a spectrum magnitude.

The machine learning system may further determine a first loss value based on differences between the first output frame and a first ground truth frame (630). In some embodiments, the first ground truth frame may represent the noise-invariant component of the first audio frame.

Further, the machine learning system may map the first audio frame to a second output frame based on the neural network, where the second output frame may represent a noise-variant component of the first audio frame (640). In some embodiments, the mapping of the first audio frame to the second output frame may be further based on a phase and/or a magnitude of the first audio frame. Further, in some embodiments, the second output frame may represent a ratio of an amount of energy in the noise-invariant component of the first audio frame relative to an amount of energy of the first audio frame (e.g., a SNR-related gain). Further, in such embodiments, the mapping of the first audio frame to the second output frame may be further based on a phase of the first audio frame.

The machine learning system may further determine a second loss value based on differences between the second output frame and a second ground truth frame (650). In some embodiments, the second ground truth frame may represent the noise-variant component of the first audio frame.

The machine learning system may also update the neural network based at least in part on the first loss value and the second loss value (660). In some embodiments, updating the neural network may include summing at least the first and second loss values to determine a total loss value. Further, in some embodiments, updating the neural network may further include determining a set of parameters for the neural network that minimizes the total loss value.

Figure 7:
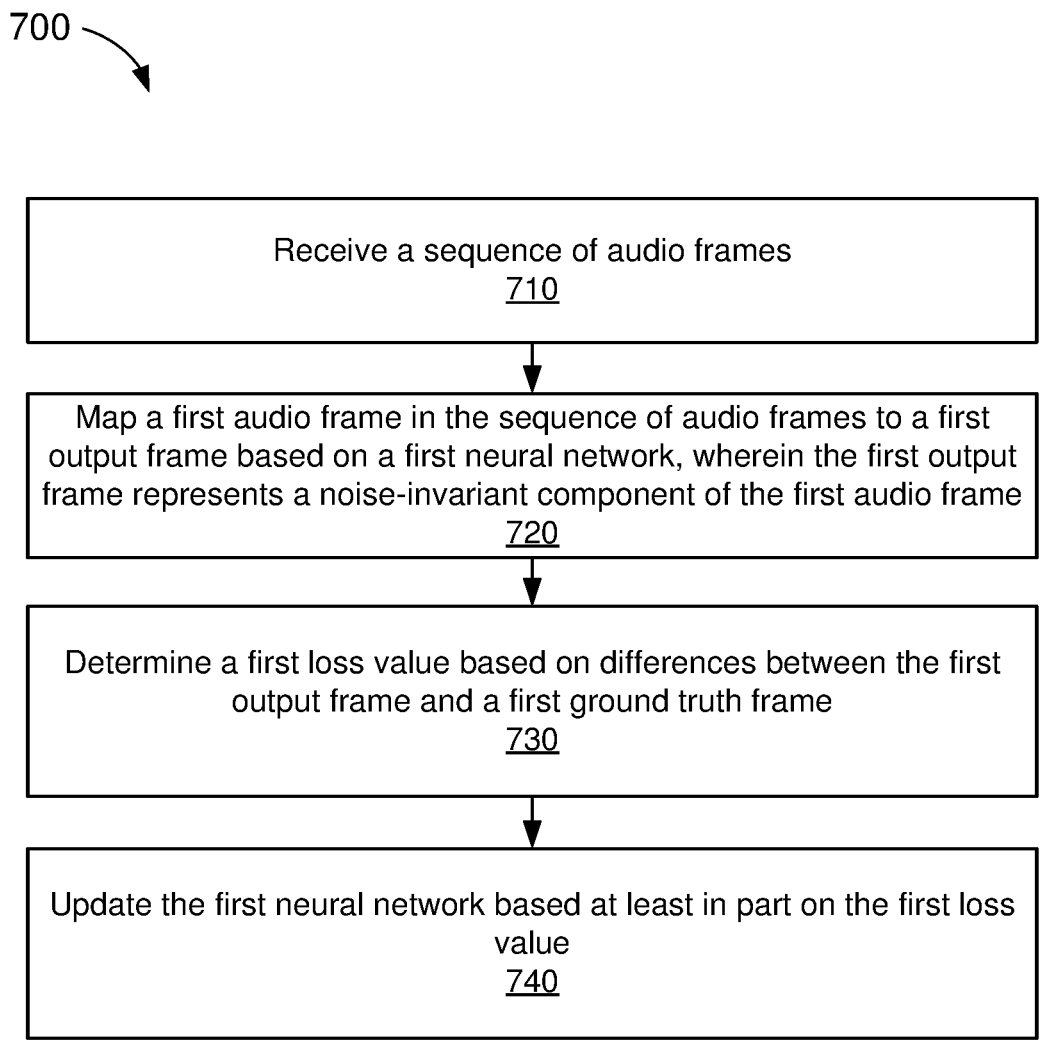
FIG. 7 shows an illustrative flowchart depicting an example operation for training neural networks, according to some embodiments.

FIG. 7 shows an illustrative flowchart depicting an example operation 700 for training neural networks, according to some embodiments. The example operation 700 may be performed by a machine learning system (such as the machine learning system 200 and/or 500 of FIGS. 2 and 5, respectively) to train neural networks to infer representations of speech (e.g., a clean speech signal) and SNR-related information in a sequence of audio frames. In some embodiments, the machine learning system may include a neural network that represents an encoder, and two neural networks that each represent a decoder. In some other embodiments, the machine learning system may include two neural networks, where each of the two neural networks represents an encoder and decoder.

As shown in FIG. 7, the machine learning system may receive a sequence of audio frames (710). In some embodiments, the sequence of audio frames may be a frequency-domain representation of an audio signal that includes a noise-invariant component and a noise-variant component. In some other embodiments, the sequence of audio input frames may include a feature map of an audio signal that includes a noise-invariant component and noise-variant component. The machine learning system may map a first audio frame in the sequence of audio frames to a first output frame based on a first neural network, where the first output frame represents a noise-invariant component of the first audio frame (720). In some embodiments, the first neural network may represent a decoder, or both an encoder and a decoder.

The machine learning system may further determine a first loss value based on differences between the first output frame and a first ground truth frame (730). In some embodiments, the first ground truth frame may represent the noise-invariant component of the first audio frame. The machine learning system may also update the first neural network based at least in part on the first loss value (740).

In some embodiments, the machine learning system may further map the first audio frame in the sequence of audio frames to a second output frame based on a second neural network, where the second output frame may represent a noise-variant component of the first audio frame. In some embodiments, the second neural network may represent a decoder, or both an encoder and decoder.

The machine learning system may further determine a second loss value based on differences between the second output frame and a second ground truth frame. In some embodiments, the second ground truth frame may represent the noise-variant component of the first audio frame. The machine learning system may also update the second neural network based at least in part on the second loss value.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

The methods, sequences or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

In the foregoing specification, embodiments have been described with reference to specific examples thereof. It will, however, be evident that various modifications and changes may be made thereto without departing from the broader scope of the disclosure as set forth in the appended claims. The specification and drawings are, accordingly, to be regarded in an illustrative sense rather than a restrictive sense.

What is claimed is:

1. A method of training neural networks, comprising:
   receiving a sequence of audio frames representing an audio signal;
   estimating a speech component of a first audio frame in the sequence of audio frames using a first head of a multi-head neural network;
   mapping, using the first head of the multi-head neural network, the first audio frame to a first output frame representing the estimated speech component of the first audio frame;
   receiving a first ground truth frame including a known speech component of the first audio frame;
   determining a first loss value based on differences between the first output frame and the first ground truth frame;
   estimating a gain associated with a signal-to-noise ratio (SNR) of the first audio frame using a second head of the multi-head neural network;
   mapping, using the second head of the multi-head neural network, the first audio frame to a second output frame representing the estimated gain of the first audio frame;
   receiving a second ground truth frame including a known gain of the first audio frame;
   determining a second loss value based on differences between the second output frame and the second ground truth frame;
   determining a total loss value based on the first loss value and the second loss value; and
   iteratively updating the multi-head neural network until the total loss value converges to a predetermined threshold amount for inferring speech from real-time audio signals.

2. The method of claim 1, wherein the mapping of the first audio frame to the second output frame is further based on a phase of the first audio frame.

3. The method of claim 2, wherein the mapping of the first audio frame to the second output frame is further based on a magnitude of the first audio frame.

4. The method of claim 1, wherein the second output frame further represents a ratio of an amount of energy in the speech component of the first audio frame relative to an amount of energy of the first audio frame.

5. The method of claim 1, wherein the received first audio frame is normalized based on a spectrum magnitude.

6. The method of claim 1, wherein the first audio frame includes a plurality of sub-frames, and wherein each of the plurality of sub-frames is associated with a respective frequency bin.

7. The method of claim 1, wherein determining the total loss value comprises:
   summing at least the first loss value and the second loss value.

8. The method of claim 7, wherein the updating of the multi-head neural network further comprises:
   determining a set of parameters for the multi-head neural network that minimizes the total loss value.

9. The method of claim 1, further comprising:
   estimating a speech component of a second audio frame in the sequence of audio frames using the first head of a multi-head neural network;
   mapping, using the first head of the multi-bead neural network, the second audio frame to a third output frame representing the estimated speech component of the second audio frame;
   receiving a third frame including a known speech component of the second audio frame;
   determining a third loss value based on differences between the third output frame and the third ground truth frame;
   estimating a gain associated with an SNR of the second audio frame using the second head of the multi-head neural network;
   mapping, using the second head of the multi-head neural network, the second audio frame to a fourth output frame representing the estimated gain of the second audio frame;
   receiving a fourth ground truth frame including a known gain of the second audio frame; and
   determining a fourth loss value based on differences between the fourth output frame and the fourth ground truth frame, wherein the multi-head neural network is further updated based on the third loss value and the fourth loss value.

10. A machine learning system comprising:
    a processing system; and
    a memory storing instructions that, when executed by the processing system, cause the machine learning system to:
    receive a sequence of audio frames representing an audio signal;
    estimate a speech component of a first audio frame in the sequence of audio frames using a first head of a multi-head neural network;
    map, using the first head of the multi-head neural network, the first audio frame to a first output frame representing the estimated speech component of the first audio frame;
    receive a first ground truth frame including a known speech component of the first audio frame;
    determine a first loss value based on differences between the first output frame and the first ground truth frame;
    estimate a gain associated with a signal-to-noise ratio (SNR) of the first audio frame using a second head of the multi-head neural network;
    map, using the second head of the multi-head neural network, the first audio frame to a second output frame representing the estimated gain of the first audio frame;
    receive a second ground truth frame including a known gain of the first audio frame;
    determine a second loss value based on differences between the second output frame and the second ground truth frame;
    determine a total loss value based on the first loss value and the second loss value; and iteratively update the multi-head neural network until the total loss value converges to a predetermined threshold amount for inferring speech from real-time audio signals.

11. The machine learning system of claim 10, wherein the mapping of the first audio frame to the second output frame is further based on a phase of the first audio frame.

12. The machine learning system of claim 11, wherein the mapping of the first audio frame to the second output frame is further based on a magnitude of the first audio frame.

13. The machine learning system of claim 10, wherein the second output frame further represents a ratio of an amount of energy in the speech component of the first audio frame relative to an amount of energy of the first audio frame.

14. The machine learning system of claim 10, wherein the received first audio frame is normalized based on a spectrum magnitude.

15. The machine learning system of claim 10, wherein the first audio frame includes a plurality of sub-frames, and wherein each of the plurality of sub-frames is associated with a respective frequency bin.

16. The machine learning system of claim 10, wherein determining the total loss value further causes the machine learning system to:
sum at least the first loss value and the second loss value.

17. The machine learning system of claim 16, wherein the updating of the multi-head neural network further causes the machine learning system to:
determine a set of parameters for the multi-head neural network that minimizes the total loss value.

18. The machine learning system of claim 10, wherein execution of the instructions further causes the machine learning system to:
estimate a speech component of a second audio frame in the sequence of audio frames using the first head of a multi-bead neural network;
map, using the first head of the multi-head neural network, the second audio frame to a third output frame representing the estimated speech component of the second audio frame;
receive a third ground truth frame including a known speech component of the second audio frame;
determine a third loss value based on differences between the third output frame and the third ground truth frame;
estimate a gain associated with an SNR of the second audio frame using the second head of the multi-head neural network;
map, using the second head of the multi-head neural network, the second audio frame to a fourth output frame representing the estimated gain of the second audio frame;
receive a fourth ground truth frame including a known gain of the second audio frame; and
determine a fourth loss value based on differences between the fourth output frame and the fourth ground truth frame, wherein the multi-head neural network is further updated based on the third loss value and the fourth loss value.

19. A method of training neural networks, comprising:
receiving a sequence of audio frames representing an audio signal;
estimating a speech component of a first audio frame in the sequence of audio frames using a first head of a multi-head neural network;
mapping, using the first head of the multi-head neural network, the first audio frame to a first output frame representing the estimated speech component of the first audio frame;
receiving a first ground truth frame including a known speech component of the first audio frame;
determining a first loss value based on differences between the first output frame and the first ground truth frame; and
iteratively updating the first neural network until one or more convergence criteria associated with the first loss value are met.

20. The method of claim 19, further comprising:
estimating a gain associated with a signal-to-noise ratio (SNR) of the first audio frame using a second head of the multi-head neural network;
mapping, using the second head of the multi-head neural network, the first audio frame to a second output frame representing the estimated gain of the first audio frame;
receiving a second ground truth frame including a known gain of the first audio frame;
determining a second loss value based on differences between the second output frame and the second ground truth frame; and
iteratively updating the second neural network until one or more convergence criteria associated with the second loss value are met.

\* \* \* \* \*